US011412505B2

(12) United States Patent
Abedini et al.

(10) Patent No.: US 11,412,505 B2
(45) Date of Patent: Aug. 9, 2022

(54) TECHNIQUES FOR A SCHEDULED ENTITY TO ADJUST TIMING IN WIRELESS NETWORKS

(71) Applicant: QUALCOMM Incorporated, San Diego, CA (US)

(72) Inventors: Navid Abedini, Somerset, NJ (US); Luca Blessent, Whitehouse Station, NJ (US); Muhammad Nazmul Islam, Littleton, MA (US); Jianghong Luo, Skillman, NJ (US); Karl Georg Hampel, Hoboken, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 17/002,536

(22) Filed: Aug. 25, 2020

(65) Prior Publication Data

US 2021/0068092 A1      Mar. 4, 2021

Related U.S. Application Data

(60) Provisional application No. 62/894,530, filed on Aug. 30, 2019.

(51) Int. Cl.
*H04W 72/04* (2009.01)
*H04W 56/00* (2009.01)

(52) U.S. Cl.
CPC ....... *H04W 72/044* (2013.01); *H04W 56/001* (2013.01); *H04W 56/006* (2013.01);
(Continued)

(58) Field of Classification Search
CPC ............. H04W 72/044; H04W 72/042; H04W 56/001; H04W 56/0045; H04W 56/006;
(Continued)

(56) References Cited

U.S. PATENT DOCUMENTS 9,281,931 B2 * 3/2016 Kwon ............... H04W 52/0229
10,321,424 B2 * 6/2019 Zhang ............... H04W 56/0065
(Continued)

FOREIGN PATENT DOCUMENTS

WO    WO-2018113397 A1 *  6/2018  ............ H04W 56/00
WO    WO-2018210281 A1 * 11/2018  ............... H04J 3/06
WO    WO-2020192657 A1 * 10/2020

OTHER PUBLICATIONS

Lukova et al, "Dynamic Self-Backhauling in 5G Networks", Sep. 9-12, 2018, IEEE, 29th Annual International Symposium on Personal, Indoor and Mobile Radio Communications (PIMRC) (Year: 2018).*

(Continued)

*Primary Examiner* — Chi H Pham
*Assistant Examiner* — Vladislav Y Agureyev
(74) *Attorney, Agent, or Firm* — Qualcomm Incorporated

(57) ABSTRACT

Aspects provide for autonomous adjustment of the uplink and downlink transmission timing in wireless communication networks. A scheduled entity (e.g., a user equipment (UE) or child integrated access backhaul (IAB) node) may observe a change in the downlink reception timing of downlink signals transmitted from a scheduling entity (e.g., a base station or parent IAB node). The scheduled entity may then autonomously adjust its uplink transmission timing to compensate for the change in downlink reception timing. In addition, the scheduled entity may further maintain the same downlink transmission timing irrespective of the change in downlink reception timing.

28 Claims, 21 Drawing Sheets

(52) U.S. Cl.
 CPC ..... *H04W 56/009* (2013.01); *H04W 56/0045* (2013.01); *H04W 72/042* (2013.01)

(58) Field of Classification Search
 CPC ........... H04W 56/009; H04W 56/0035; H04W 56/0075; H04W 56/0015
 See application file for complete search history.

(56) References Cited

U.S. PATENT DOCUMENTS

| | | | |
|---|---|---|---|
| 10,827,547 B2* | 11/2020 | Novlan | H04W 76/15 |
| 2008/0084849 A1 | 4/2008 | Wang et al. | |
| 2013/0272231 A1* | 10/2013 | Dinan | H04L 61/6022 370/329 |
| 2018/0076839 A1* | 3/2018 | Baghel | H04W 52/283 |
| 2019/0014548 A1 | 1/2019 | Pelletier et al. | |
| 2019/0037515 A1* | 1/2019 | Shamir | G01R 25/005 |
| 2019/0075535 A1* | 3/2019 | Shiobara | H04W 56/0015 |
| 2019/0223178 A1 | 7/2019 | Bergstrom et al. | |
| 2019/0361436 A1* | 11/2019 | Ueda | B60W 30/08 |
| 2019/0373592 A1* | 12/2019 | Ji | H04B 7/022 |
| 2020/0045734 A1* | 2/2020 | Park | H04W 16/14 |
| 2020/0053724 A1* | 2/2020 | MolavianJazi | H04W 52/146 |
| 2020/0092871 A1* | 3/2020 | Axnas | H04W 56/0055 |
| 2020/0145952 A1 | 5/2020 | Keskitalo et al. | |
| 2020/0163023 A1* | 5/2020 | Pelletier | H04W 72/042 |
| 2020/0212970 A1 | 7/2020 | Wang et al. | |
| 2020/0351728 A1* | 11/2020 | Chien | H04W 36/08 |
| 2021/0051634 A1* | 2/2021 | Fakoorian | H04W 72/0413 |
| 2021/0058884 A1* | 2/2021 | Liu | H04J 3/06 |
| 2021/0068066 A1 | 3/2021 | Abedini et al. | |
| 2021/0168743 A1* | 6/2021 | Sheng | H04W 56/001 |
| 2021/0195539 A1* | 6/2021 | Sheng | H04W 56/00 |
| 2021/0314838 A1* | 10/2021 | Sheng | H04W 36/0055 |
| 2021/0345279 A1* | 11/2021 | Ying | H04W 56/0055 |
| 2021/0392635 A1* | 12/2021 | Ji | H04W 72/042 |

OTHER PUBLICATIONS

International Search Report and Written Opinion—PCT/US2020/047951—ISA/EPO—dated Nov. 26, 2020.

* cited by examiner

TECHNIQUES FOR A SCHEDULED ENTITY TO ADJUST TIMING IN WIRELESS NETWORKS

CROSS-REFERENCE TO RELATED APPLICATIONS

This application claims priority to and the benefit of Provisional Patent Application No. 62/894,530, entitled "Techniques for Adjusting Timing in Wireless Networks," filed in the U.S. Patent and Trademark Office on Aug. 30, 2019, the entire contents of which are incorporated herein by reference as if fully set forth below in their entirety and for all applicable purposes. This application is further related to concurrently filed, U.S. Non-Provisional application Ser. No. 17/002,560, filed on the same day as this application, which is incorporated herein by reference as if fully set forth below.

TECHNICAL FIELD

The technology discussed below relates generally to wireless communication systems, and more particularly, to techniques for adjusting downlink and uplink transmission timing in wireless networks, such as integrated access backhaul (IAB) networks.

INTRODUCTION

In wireless communication networks, time synchronization allows for successful communication between sending and receiving nodes in the network. For example, the subframe or slot boundaries may be synchronized across one or more base stations within a wireless network to reduce interference between cells and between user equipment (UEs) within the cells.

To maintain the slot synchronization for uplink communication from a UE to a base station, the base station may estimate a round-trip time (RTT) of communication between the base station and the UE and provide a timing advance (TA) command to the UE containing a TA value indicative of the RTT. The UE may monitor the downlink reception timing of downlink signals from the base station and adjust the uplink transmission timing based on the difference between the downlink transmission timing and the TA value. In some examples, the TA value indicates the change of uplink transmission timing relative to the current uplink transmission timing.

Time synchronization may be implemented in both single hop wireless networks (e.g., between a base station and a UE) and in multi-hop wireless networks, such as integrated access backhaul (IAB) networks, that utilize wireless spectrum for both access links (links to UEs) and backhaul links (links to the core network via other IAB nodes). In some IAB networks, one or more of the IAB nodes (e.g., base stations) may be mobile. As such, IAB networks may support TA command signaling on both access links and backhaul links.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication at a scheduled entity within a wireless communication network is disclosed. The method can include entering an autonomous time adjustment mode to autonomously adjust an uplink transmission timing of the scheduled entity, observing a change in downlink reception timing of downlink signals received from a scheduling entity by a reception timing difference, determining a transmission timing difference based on the reception timing difference to compensate for the change in the downlink reception timing, and autonomously adjusting the uplink transmission timing of uplink signals transmitted to the scheduling entity by the transmission timing difference.

Another example provides a scheduled entity in a wireless communication network including a wireless transceiver configured to communicate with a scheduling entity in the wireless communication network, a memory, and a processor coupled to the wireless transceiver and the memory. The processor and the memory can be configured to enter an autonomous time adjustment mode to autonomously adjust an uplink transmission timing of the scheduled entity, observe a change in downlink reception timing of downlink signals received from a scheduling entity by a reception timing difference, determine a transmission timing difference based on the reception timing difference to compensate for the change in the downlink reception timing, and autonomously adjust the uplink transmission timing of uplink signals transmitted to the scheduling entity by the transmission timing difference.

Another example provides a scheduled entity in a wireless communication network. The scheduled entity can include means for entering an autonomous time adjustment mode to autonomously adjust an uplink transmission timing of the scheduled entity, means for observing a change in downlink reception timing of downlink signals received from a scheduling entity by a reception timing difference, means for determining a transmission timing difference based on the reception timing difference to compensate for the change in the downlink reception timing, and means for autonomously adjusting the uplink transmission timing of uplink signals transmitted to the scheduling entity by the transmission timing difference.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
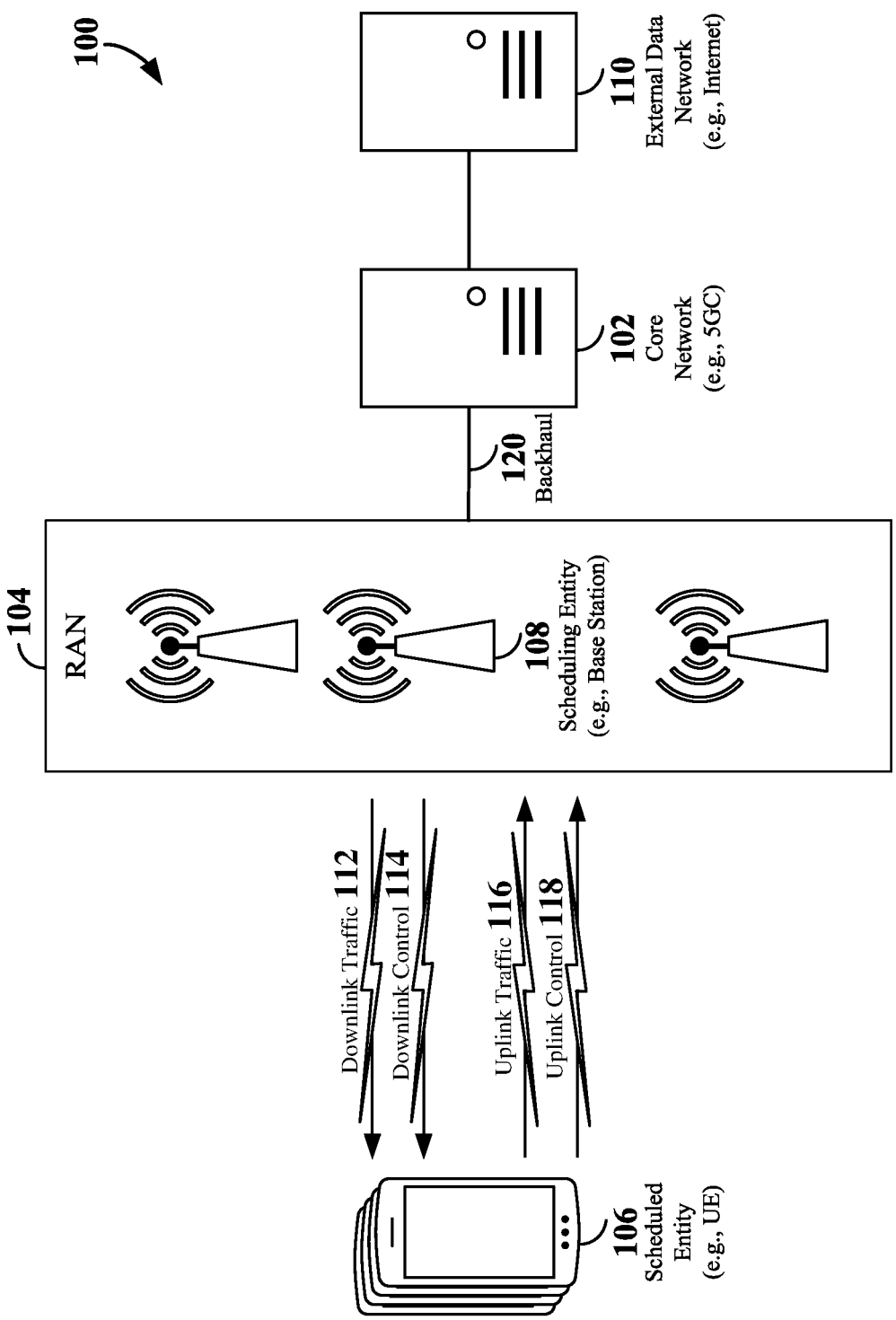
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to autonomous adjustment of the uplink and downlink transmission timing in wireless networks. A scheduled entity (e.g., UE or a child IAB node) may observe a change in the downlink reception timing of downlink signals transmitted from a scheduling entity (e.g., a base station or parent IAB node). The scheduled entity may then autonomously adjust its uplink transmission timing to compensate for the change in the downlink reception timing. In some examples, the uplink transmission timing may be adjusted by a transmission timing difference equal to the negative of twice the downlink reception timing change. In addition, the scheduled entity may further maintain the same downlink transmission timing regardless of the change in downlink reception timing.

In some examples, the scheduled entity may operate in an autonomous time adjustment mode to autonomously adjust the uplink transmission timing. In some examples, the scheduled entity may enter the autonomous time adjustment mode upon receiving an instruction from the scheduling entity or a centralized network node in the wireless network. In other examples, the scheduled entity may directly enter the autonomous time adjustment mode based upon one or more criteria. Examples of criteria may include, for example, a number of synchronization sources utilized to synchronize its internal timing reference, a respective link quality associated with one or more of the synchronization sources, a respective confidence metric indicating a respective timing confidence of each of the one or more synchronization sources, or a respective mobility state of at least one of the scheduled entity or the scheduling entity. In addition, the scheduled entity may enter the autonomous time adjustment mode after tracking the downlink transmission timing in the wireless communication network from the scheduling entity for a period of time.

In some examples, the scheduled entity may further transmit at least one unadjusted uplink signal with unadjusted uplink transmission timing to the scheduling entity to enable the scheduling entity to estimate and update the RTT. In other examples, the scheduled entity may transmit an estimation of the RTT to the scheduling entity.

In some examples, the scheduled entity may operate in a tracking mode to receive a TA command including a TA value from the scheduling entity and autonomously adjust the TA value based on the transmission timing difference. In other examples, the scheduled entity may operate in an open-loop mode to autonomously adjust the uplink transmission timing based on the transmission timing difference and a skew between the downlink transmission timing and the uplink transmission timing.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable radio access technology (RAT) or RATs to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-topoint transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
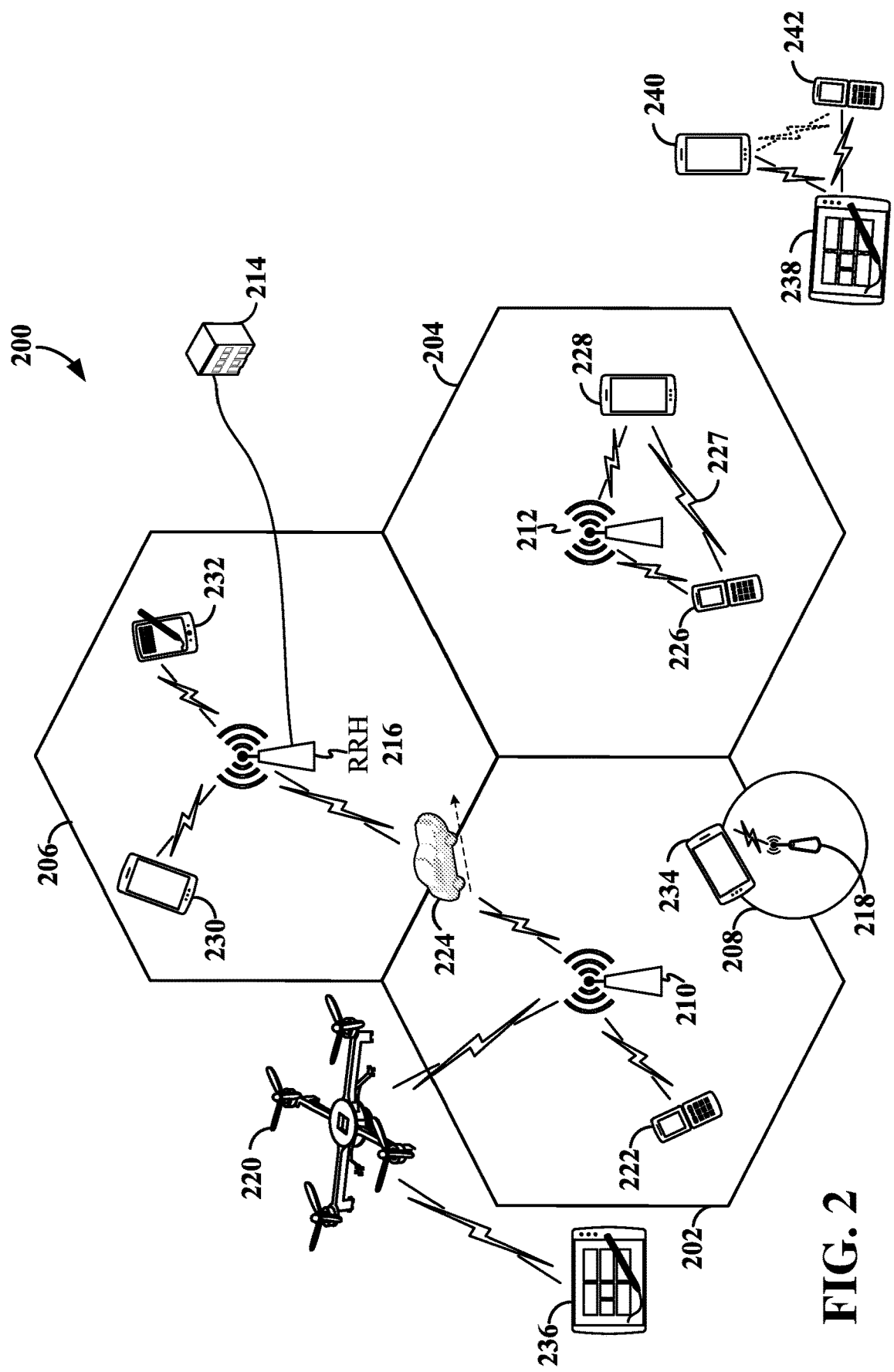
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D), peer-to-peer (P2P), vehicle-to-vehicle (V2V) network, and/or vehicle-to-everything (V2X). For example, two or more UEs (e.g., UEs 226 and 228) within the coverage area of a serving base station 212 may communicate with each other using sidelink signals 227 without relaying that communication through the base station. In this example, the base station 212 or one or both of the UEs 226 and 228 may function as scheduling entities to schedule sidelink communication between UEs 226 and 228. In some examples, the sidelink signals 227 include sidelink traffic and sidelink control. In a further example, UEs outside the coverage area of a base station may communicate over a sidelink carrier. For example, UE 238 is illustrated communicating with UEs 240 and 242. Here, the UE 238 may function as a scheduling entity or a transmitting sidelink device, and UEs 240 and 242 may each function as a scheduled entity or a receiving sidelink device (and vice-versa).

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
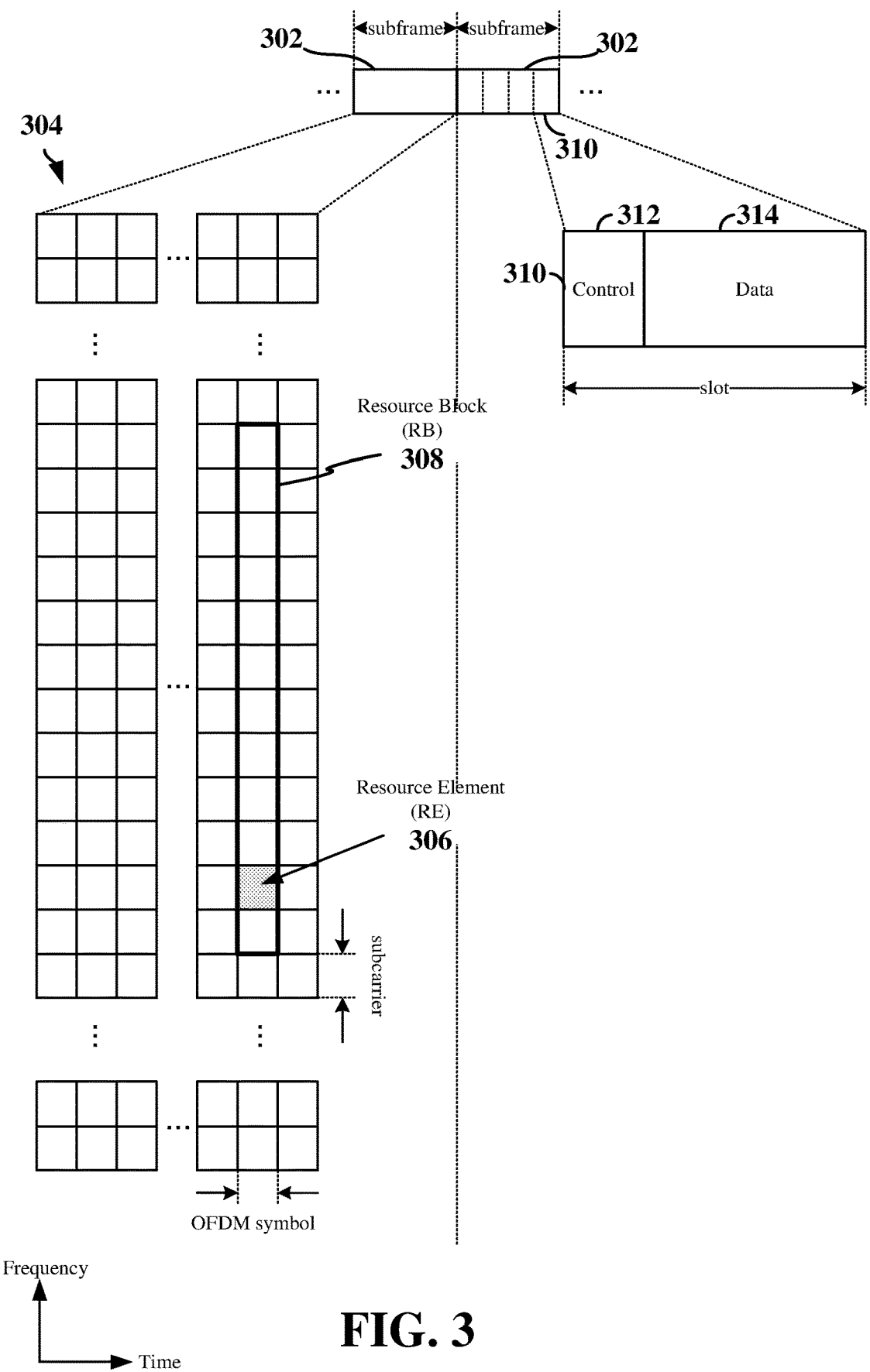
FIG. 3 is a schematic diagram illustrating organization of wireless resources in an air interface utilizing orthogonal frequency divisional multiplexing (OFDM).

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs (scheduled entities) for downlink or uplink transmissions typically involves scheduling one or more resource elements 306 within one or more sub-bands or bandwidth parts (BWPs). Thus, a UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), channel state information-reference signal (CSI-RS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the base station may allocate one or more REs 306 (e.g., within a control region 312) to carry DL control information including one or more DL control channels, such as a physical hybrid automatic repeat request (HARQ) indicator channel (PHICH), a physical downlink control channel (PDCCH), etc., to one or more scheduled entities. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 to carry other DL signals, such as a DMRS; a phase-tracking reference signal (PT-RS); a CSI-RS; a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, a list of common search spaces, a paging search space, downlink configuration information, and uplink configuration information. The MIB and SIB1 together provide the minimum system information (SI) for initial access.

In an UL transmission, the UE may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry SIBs (e.g., SIB1), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
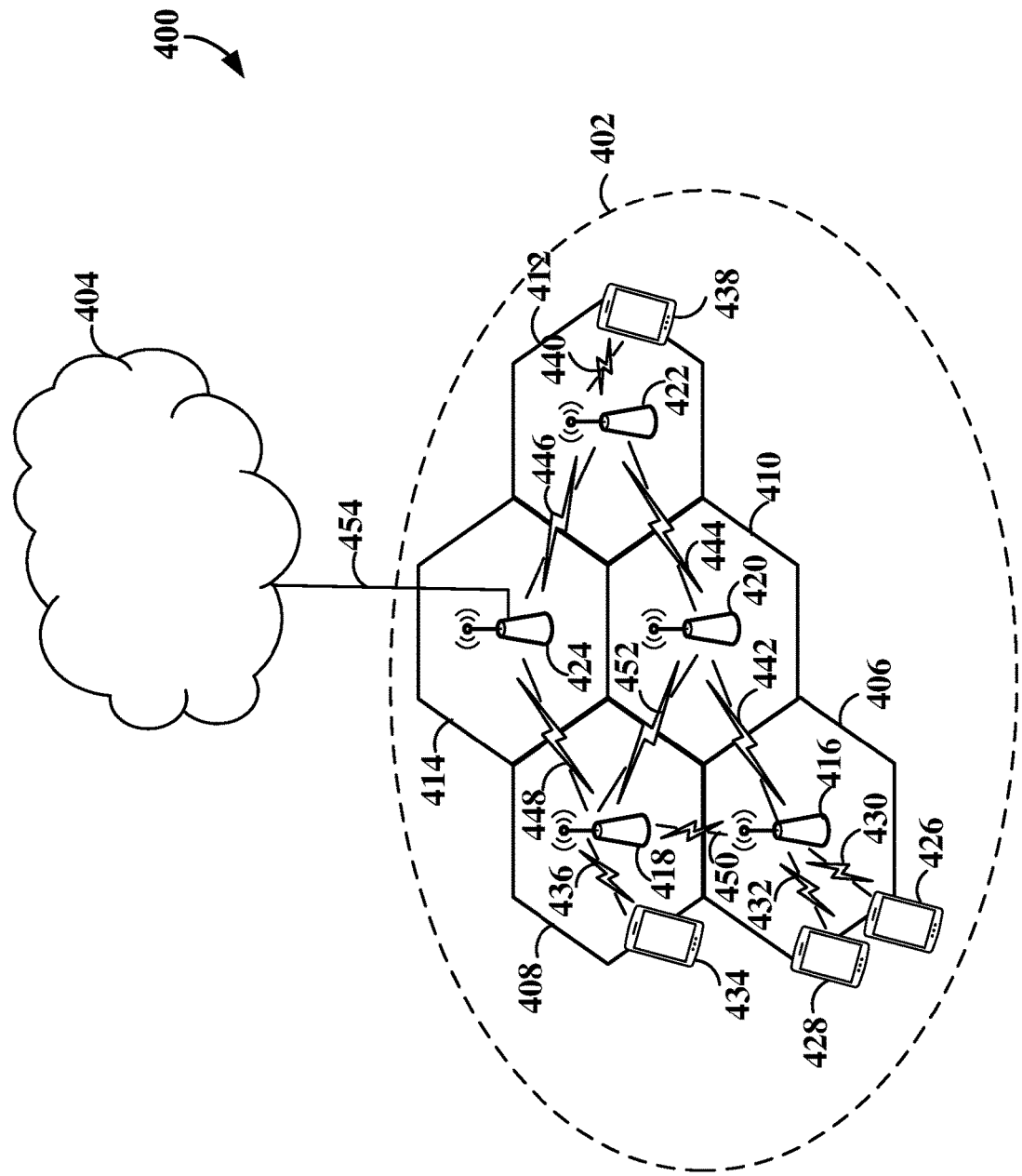
FIG. 4 is a diagram providing a high-level illustration of one example of a network configuration including an integrated access backhaul (IAB) network.

FIG. 4 is a schematic diagram providing a high-level illustration of one example of an integrated access backhaul (IAB) network configuration 400 that may be utilized in some aspects of the disclosure. In this illustration, a communication network 402, such as an IAB network, is coupled to a remote network 404, such as a main backhaul network or mobile core network. In such an IAB network 402, the wireless spectrum may be used for both access links and backhaul links. In some examples, the wireless spectrum may utilize millimeter-wave (mmWave) or sub-6 GHz carrier frequencies.

The IAB network 402 may be similar to the radio access network 200 shown in FIG. 2, in that the IAB network 402 may be divided into a number of cells 406, 408, 410, 412, and 414, each of which may be served by a respective IAB node 416, 418, 420, 422, and 424. Each of the IAB nodes 416-424 may be an access point, base station (BS), eNB, gNB, or other node that utilizes wireless spectrum (e.g., the radio frequency (RF) spectrum) to support access for one or more UEs located within the cells 406-414 served by the IAB nodes.

In the example shown in FIG. 4, IAB node 416 communicates with UEs 426 and 428 via wireless access links 430 and 432, IAB node 418 communicates with UE 434 via wireless access link 436, and IAB node 422 communicates with UE 438 via wireless access link 440. The IAB nodes 416-424 are further interconnected via one or more wireless backhaul links 442, 444, 446, 448, 450, and 452. Each of the wireless backhaul links 442-452 may utilize the same wireless spectrum (e.g., the radio frequency (RF) spectrum) as the access links 430-440 to backhaul access traffic to/from the remote network 404. This may be referred to as wireless self-backhauling. Such wireless self-backhauling can enable fast and easy deployment of highly dense small cell networks. That is, rather than requiring each new gNB deployment to be outfitted with its own hard-wired backhaul connection, the wireless spectrum utilized for communication between the gNB and UE may be leveraged for backhaul communication between any number of IAB nodes to form the IAB network 402.

In the example shown in FIG. 4, IAB node 416 communicates with IAB node 420 via wireless backhaul link 442, IAB node 420 communicates with IAB node 422 via wireless backhaul link 444, IAB node 422 communicates with IAB node 424 via wireless backhaul link 446, IAB node 424 communicates with IAB node 418 via wireless backhaul link 448, IAB node 418 communicates with IAB node 416 via wireless backhaul link 450, and IAB node 418 communicates with IAB node 420 via wireless backhaul link 452. As shown in FIG. 4, each IAB node 416-424 may be connected via respective wireless backhaul links 442-452 to two or more other IAB nodes for robustness.

Some or all of the IAB nodes 416-424 may also be connected via wired backhaul links (e.g., fiber, coaxial cable, Ethernet, copper wires, etc.) and/or microwave backhaul links. Thus, the IAB network 402 may support both wired/microwave and wireless backhaul traffic. At least one of the IAB nodes (e.g., IAB node 424) may be a border IAB node, also referred to herein as an IAB donor node, that also provides a communication link 454 to the remote network 404. For example, the IAB donor node 424 may include a wired (e.g., fiber, coaxial cable, Ethernet, copper wires), microwave, or other suitable link 454 to the remote network 404.

To facilitate wireless communication between the IAB nodes 416-424 and between the IAB nodes 416-424 and the UEs served by the IAB nodes 416-424, each IAB node 416-424 may be configured to operate as both a scheduling entity and a scheduled entity. Thus, an IAB node (e.g., IAB node 416) may utilize the same wireless spectrum to transmit access traffic to/from UEs and to then backhaul that access traffic to/from the remote network 404. For example, to backhaul access traffic to/from IAB node 418, IAB node 418 may communicate with IAB node 420 to transmit backhaul access traffic via wireless backhaul link 442, IAB node 420 may communicate with IAB node 422 to transmit the backhaul access traffic via wireless backhaul link 444, and IAB node 422 may communicate with IAB node 424 to transmit the backhaul access traffic via wireless backhaul link 446. In this example, IAB nodes 420 and 422 may each operate as both a scheduling entity and a scheduled entity to backhaul access traffic to/from IAB node 416. As such, communication between a pair of IAB nodes may be individually scheduled by one of the IAB nodes within the pair.

In other examples, an IAB node may schedule wireless backhaul communications between other pairs of IAB nodes. For example, IAB node 424 may operate as the scheduling entity for the IAB network 402, while IAB nodes 416, 420, and 422 each operate as a scheduled entity to backhaul access traffic to/from IAB node 416. In this example, IAB node 424 may schedule wireless backhaul communications between each of the pairs of IAB nodes (e.g., between IAB node 416 and IAB node 420, between IAB node 420 and IAB node 422, and between IAB node 422 and IAB node 424). As another example, IAB node 422 may operate as a scheduling entity to schedule wireless backhaul communications between IAB nodes 416 and 420 and also between IAB node 420 and IAB node 422. IAB node 422 may then operate as a scheduled entity to allow IAB node 424 to schedule wireless backhaul communications therebetween.

Figure 5:
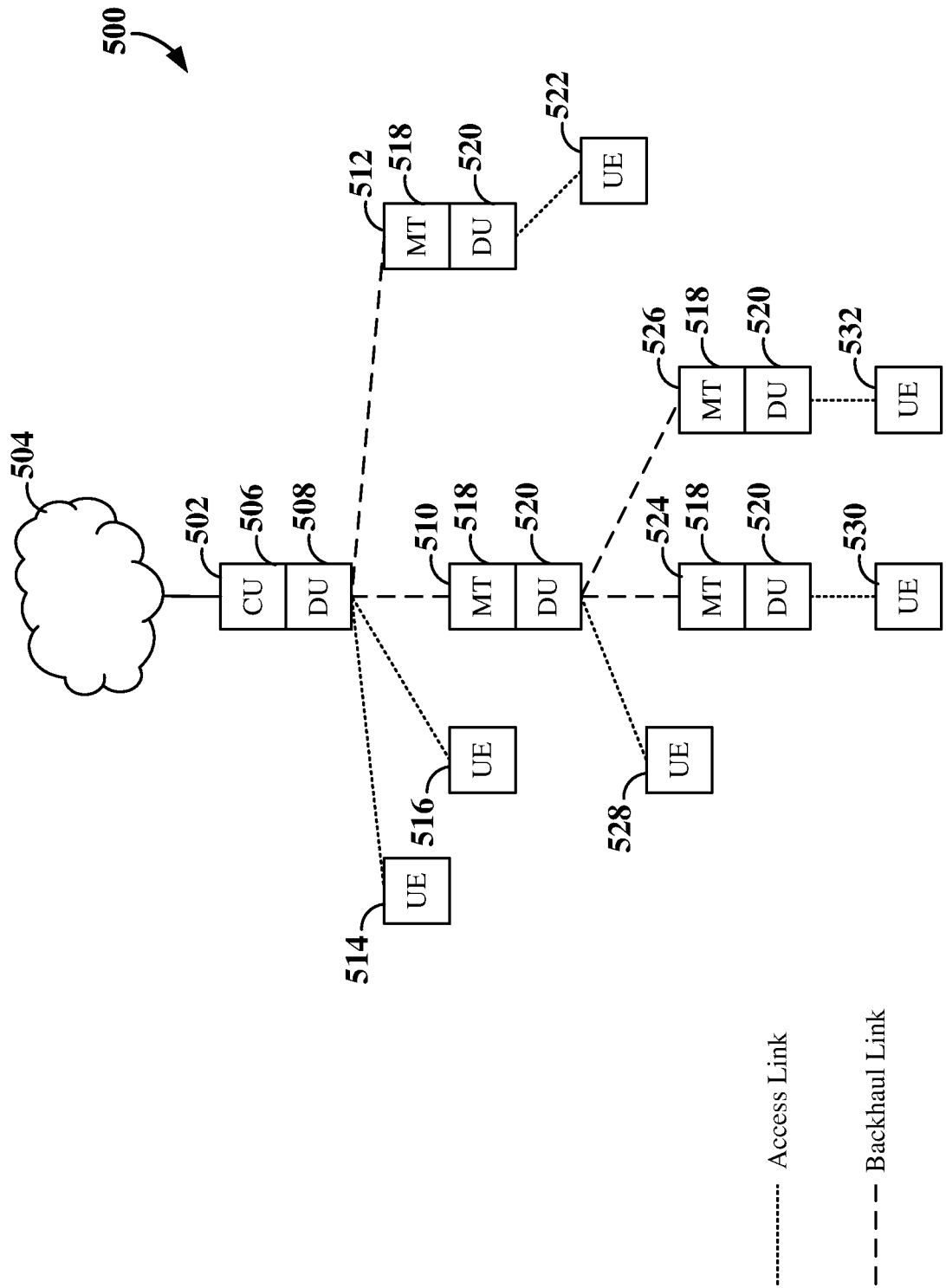
FIG. 5 is a diagram illustrating an example of IAB node functionality within an IAB network.

FIG. 5 is a schematic diagram illustrating an example of IAB node functionality within an IAB network 500. In the example shown in FIG. 5, an IAB node 502 is shown coupled to a core network 504 via a wireline connection. This IAB node 502 may be referred to herein as an IAB donor node, which may be, for example, an enhanced gNB including functionality for controlling the IAB network 500. In some examples, the IAB donor node 502 may include a central unit (CU) 506 and a distributed unit (DU) 508. The CU 506 is configured to operate as a centralized network node (or central entity) within the IAB network 500. For example, the CU 506 may include radio resource control (RRC) layer functionality and packet data convergence protocol (PDCP) layer functionality to control/configure the other nodes (e.g., IAB nodes and UEs) within the IAB network 500.

The DU 508 is configured to operate as a scheduling entity to schedule scheduled entities (e.g., other IAB nodes and UEs) of the IAB donor node 502. For example, the DU 508 of the IAB donor node 502 may operate as a scheduling entity to schedule IAB nodes 510 and 512 and UEs 514 and 516. Thus, the DU 508 of the IAB donor node 502 may schedule communication with IAB nodes 510 and 512 via respective backhaul links and schedule communication with UEs 514 and 516 via respective access links. In some examples, the DU 508 may include the radio link control (RLC), medium access control (MAC), and physical (PHY) layer functionality to enable operation as a scheduling entity.

Each of the IAB nodes 510 and 512 may be configured as a Layer 2 (L2) relay node including a respective DU 520 and a mobile termination (MT) unit 518 to enable each L2 relay IAB node 510 and 512 to operate as a scheduling entity and a scheduled entity. For example, the MT unit 518 within each of the L2 relay IAB nodes 510 and 512 is configured to operate as a scheduled entity that may be scheduled by the IAB donor node 502. Each MT unit 518 within the L2 relay IAB nodes 510 and 512 further facilitates communication with the IAB donor node 502 via respective backhaul links. In addition, the DU 520 within each of the L2 relay IAB nodes 510 and 512 operates similar to the DU 508 within the IAB donor node 502 to function as a scheduling entity to schedule one or more respective scheduled entities (e.g., other IAB nodes and/or UEs) of the L2 relay IAB nodes 510 and 512.

For example, the DU 520 of L2 relay IAB node 512 functions as a scheduling entity to schedule communication with a UE 522 via an access link, while the DU 520 of L2 relay IAB node 510 functions as a scheduling entity to schedule communication with the MT units 518 of L2 relay IAB nodes 526 and 526 via respective backhaul links and a UE 528 via an access link Each of the L2 relay IAB nodes 524 and 526 further includes a respective DU 520 that functions as a scheduling entity to communicate with respective UEs 530 and 532. Thus, in the network topology illustrated in FIG. 5, since IAB donor node 502 is configured to control each of the other nodes in the IAB network, the IAB donor node 502 is a parent IAB node of child IAB nodes 510, 512, 524 and 526. In addition, IAB node 510 is further a parent IAB node of child IAB nodes 524 and 526. For example, the CU 506 and DU 508 within IAB donor node 502 may function as the parent IAB node of child IAB nodes 510, 512, 524, and 526 and the DU 520 within IAB node 510 may function as the parent IAB node of child IAB nodes 524 and 526. The MT unit 518 within IAB nodes 510, 512, 524, and 526 may further function as child IAB nodes.

In a mobile IAB network, one or more of the L2 relay IAB nodes 510, 512, 524, and/or 526 may be moving within the IAB network 500. For example, an L2 relay IAB node (e.g., IAB node 524) may be a mobile IAB node installed on a bus, train, taxi, platooned vehicle, or other moveable object. As a mobile child IAB node 524 moves through the IAB network 500, the propagation delay from the parent IAB node 510 to the child IAB node 524 dynamically changes. Thus, the downlink reception timing of downlink signals received at the child IAB node 524 changes. To ensure synchronization of downlink and uplink transmission timing between the parent IAB node 510 and child IAB node 524, the parent IAB node 510 may measure the round-trip time (RTT) of communication between the parent IAB node 510 and the child IAB node 524 and provide a timing advance (TA) command to the UE containing a TA value indicative of the RTT for use by the child IAB node 524 in adjusting the uplink transmission timing of signals to the parent IAB node 510.

Figure 6:
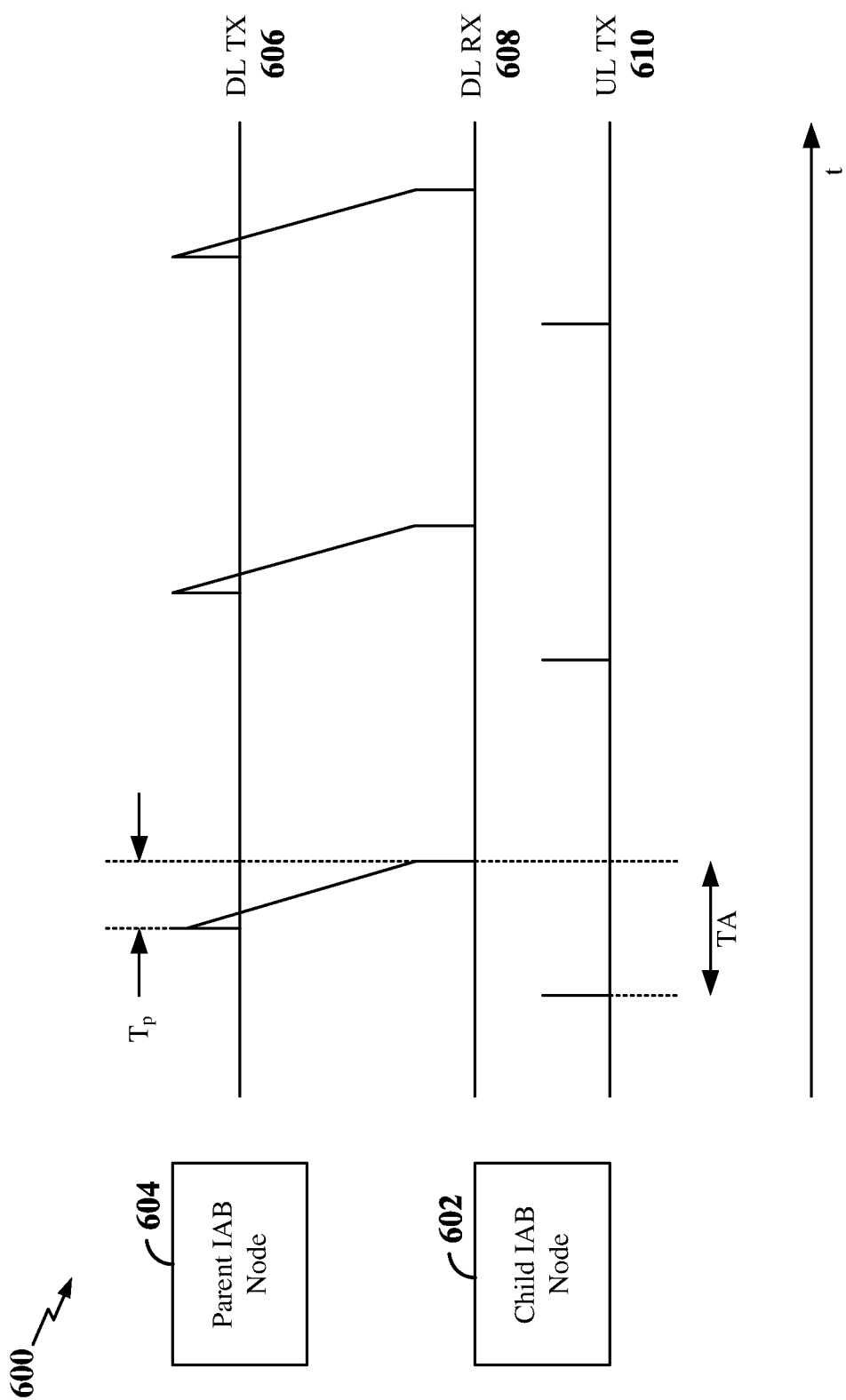
FIG. 6 is a diagram illustrating an example of time synchronization in an IAB network.

FIG. 6 illustrates an example of time synchronization in an IAB network 600. In the example shown in FIG. 6, a child IAB node 602 (e.g., an MT unit of an IAB node) is in wireless communication with a parent IAB node 604 (e.g., a DU of an IAB node) over a backhaul link Each IAB node 602 and 604 may correspond, for example, to any of the IAB nodes illustrated in FIG. 4 or 5. The downlink reception timing (DL RX) 608 of the child IAB node 602 in relation to the downlink transmission timing (DL TX) 606 of the parent IAB node 604 over a period of time (t) is shown in FIG. 6. As can be seen in the example of FIG. 6, there is a propagation delay ($T_p$) between the DL TX 606 and DL RX 608. The propagation delay ($T_p$) is representative of the over-the-air transmission time of packets transmitted from the parent IAB node 604 to the child IAB node 602.

FIG. 6 further illustrates the uplink transmission timing (UL TX) 610 of uplink signals transmitted from the child IAB node 602 to the parent IAB node 604. The UL TX 610 of the child IAB node 602 is adjusted based on a timing advance (TA) command including a TA value received from the parent IAB node 604. The TA value is indicative of a round-trip time (RTT) of communication between the parent IAB node 604 and the child IAB node 602. For example, the RTT may be equal to twice the propagation delay ($T_p$). In some examples, the parent node 604 may estimate the RTT based on uplink signals, such as random access signals, received from the child IAB node 602. For example, the child IAB node 602 may transmit a random access preamble message to the parent IAB node 604. From the random access preamble message, the parent IAB node 604 (or centralized network node, such as IAB donor node central unit) may estimate the RTT and convey the TA command to the child IAB node 602 within a random access response message.

The child IAB node 602 may adjust the UL TX 610 based on the DL RX 608 and the TA value. For example, the child IAB node 602 may set the UL TX 610 based on the difference between the DL RX 608 and the TA value. The child IAB node 602 may continually track the DL RX 608 and adjust the UL TX 610 based on the DL RX 608 and the current TA value.

Figure 7:
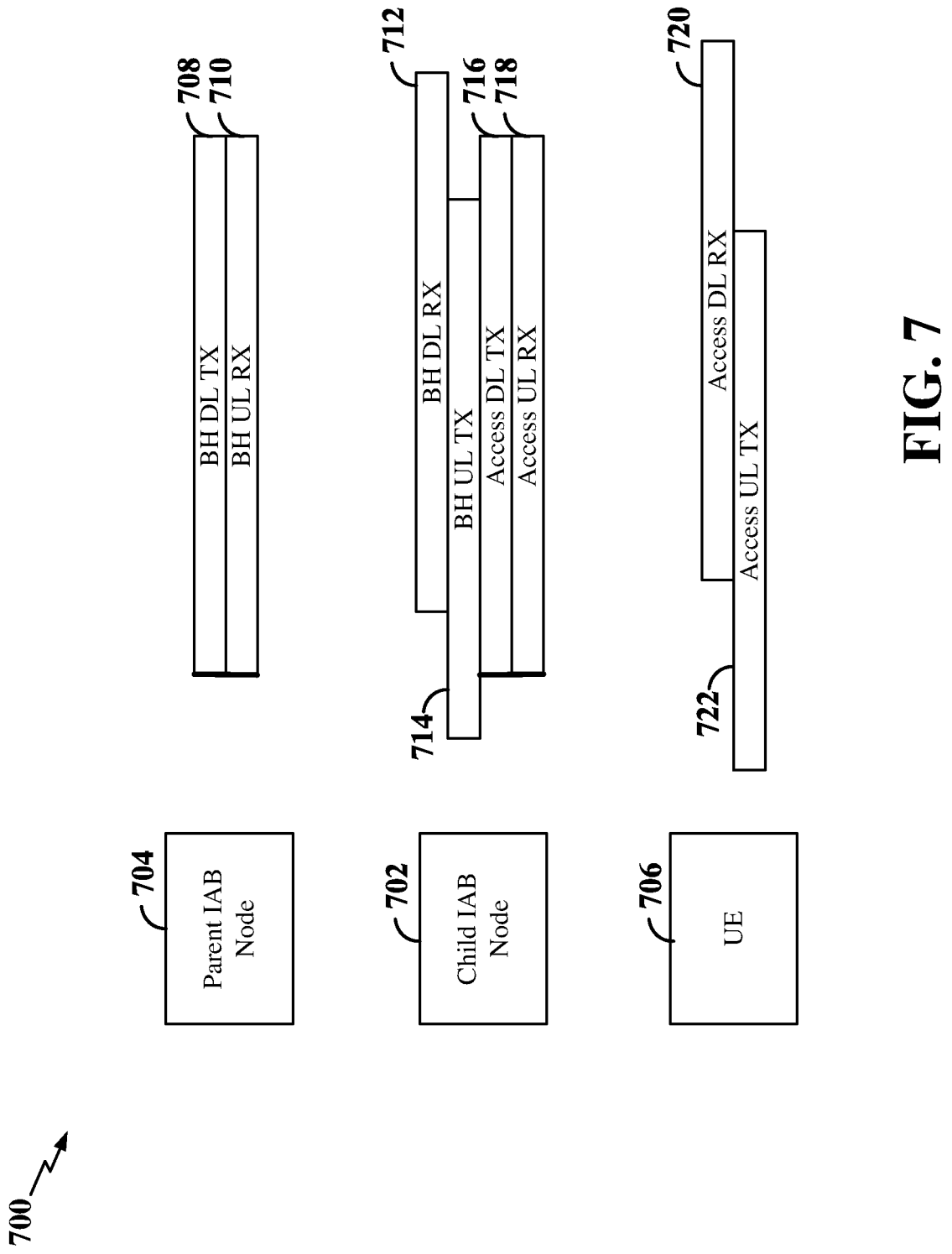
FIG. 7 is a diagram illustrating another example of time synchronization in an IAB network.

Within an IAB network, there may be multiple hops between the IAB donor node and UEs. To reduce interference between neighboring IAB nodes and between UEs, the downlink transmission timing and uplink reception timing of IAB nodes may be synchronized throughout the IAB network. FIG. 7 illustrates another example of time synchronization in an IAB network 700. In the example shown in FIG. 7, a child IAB node 702 (e.g., an MT unit of an IAB node) is in communication with a parent IAB node 704 (e.g., a DU of an IAB node) over a backhaul link Each IAB node 702 and 704 may correspond, for example, to an IAB node, as shown in FIG. 4 or 5. In addition, the child IAB node 702 is in communication with a UE 706 (e.g., scheduled entity) via an access link. The UE 706 may correspond, for example, to any of the UEs illustrated in FIGS. 1, 2, 4, and/or 5.

In the example shown in FIG. 7, the backhaul downlink transmission timing (BH DL TX) of the parent IAB node 704 is aligned with the access downlink transmission timing (Access DL TX) 716 of the child IAB node 702, and the backhaul uplink reception timing (BH UL RX) 710 of the parent IAB node 704 is aligned with the access uplink reception timing (Access UL RX) 718 of the child IAB node 702. Alignment of the backhaul and access timing at the parent IAB node 704 and child IAB node 702, respectively, may reduce interference between IAB nodes and between UEs.

FIG. 7 further illustrates the backhaul downlink reception timing (BH DL RX) 712 of the child IAB node 602 in relation to the BH DL TX 708 of the parent IAB node 704. As can be seen in the example of FIG. 7, there is a propagation delay between the BH DL TX 708 and the BH DL RX 712. In addition, the backhaul uplink transmission timing (BH UL TX) 714 of the child IAB node 702 is also illustrated in relation to the BH UL RX 710 of the parent IAB node 704. As can be seen in the example of FIG. 7, the BH UL TX 714 is adjusted by a TA value relative to the BH DL RX 712.

At the UE 706, FIG. 7 further illustrates the access downlink reception timing (Access DL RX) 720 of the UE 706 in relation to the Access DL TX 716 of the child IAB node 704 and the access uplink transmission timing (Access UL TX) 722 of the UE 706 in relation to the Access UL RX 718 of the child IAB node 702. As can be seen in the example of FIG. 7, there is a propagation delay between the Access DL TX 716 and the Access DL RX 720. In addition, the Access UL TX 722 is adjusted by a TA value relative to the Access DL RX 720.

Figure 8:
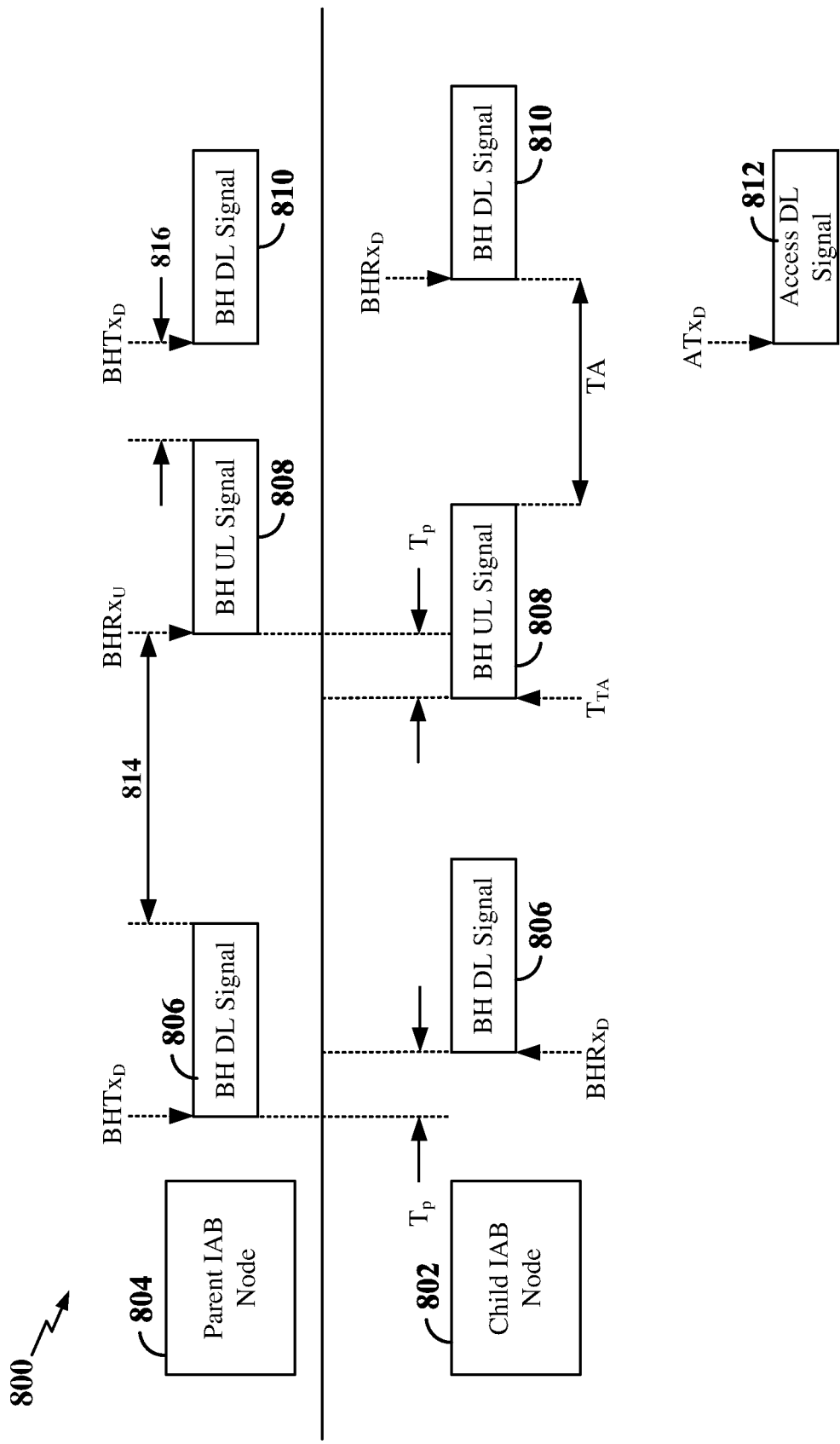
FIG. 8 is a diagram illustrating another example of time synchronization in an IAB network.

FIG. 8 illustrates an example of time synchronization in an IAB network 800 implementing TDD. In the example shown in FIG. 8, a child IAB node 802 (e.g., an MT unit of an IAB node) is in wireless communication with a parent IAB node 804 (e.g., a DU of an IAB node) over a backhaul link Each IAB node 802 and 804 may correspond, for example, to any of the IAB nodes illustrates in FIG. 4 or 5.

In the example shown in FIG. 8, the parent IAB node 804 transmits a backhaul downlink (BH DL) signal 806 at a downlink transmission time (BHTx$_D$), which is received by the child IAB node 802 at a downlink reception time (BHRx$_D$). As can be seen in FIG. 8, there is a propagation delay ($T_p$) between the BHTx$_D$ and the BHRx$_D$ of the downlink signal 806. Following the downlink signal 806, the parent IAB node 804 may receive an uplink signal 808 at an uplink reception time (BHRx$_U$) and then transmit another downlink signal 810 at another downlink transmission time (BHTx$_D$). In some examples, each downlink signal 806 and 810 may include a PDCCH and/or PDSCH, while the uplink signal 808 may include a PUSCH and/or PUCCH. The downlink signals 806 and 810 and uplink signal 808 may be included within a single slot or across two or more slots.

To facilitate switching between downlink transmission and uplink reception at the parent IAB node 804, a respective gap 814 and 816 may be implemented between the downlink signal 806 and the uplink signal 808 and between the uplink signal 808 and the downlink signal 810. The gap 816 ($G_{RX2TX}$) between the uplink signal 808 and the downlink signal 810 may be expressed as:

$$G_{RX2TX} = N_{TA,offset} + \Delta \quad \text{(Equation 1)}$$

where $N_{TA,offset}$ is the network timing offset between uplink and downlink signals and $\Delta$ is a variable set by the parent IAB node 804. In addition, the gap 814 ($G_{TX2RX}$) between the downlink signal 806 and the uplink signal 808 may be expressed as:

$$G_{TX2RX} = G_p - N_{TA,offset} - \Delta \quad \text{(Equation 2)}$$

where $G_p$ is a guard period representing the total gap (e.g., $G_{TX2RX} + G_{RX2TX}$).

To align reception of the uplink signal 808 at the parent IAB node 804 with the uplink reception time (UL RX), the child IAB node 802 may adjust the uplink transmission time of the uplink signal 808 based on the BHRx$_D$ of downlink signals 806 and 810 and a TA value sent to the child IAB node 802 from the parent IAB node 804. The TA value may be expressed as:

$$TA = N_{TA,offset} + N_{TA}, \quad \text{(Equation 3)}$$

where:

$$N_{TA} = 2T_p + \Delta. \quad \text{(Equation 4)}$$

The child IAB node 802 may begin transmission of the uplink signal 808 at time $T_{TA}$, which may be expressed as:

$$T_{TA} = TA * T_c, \quad \text{(Equation 5)}$$

where $T_c$ is a basic unit time that is based on the subcarrier spacing and Fast Fourier Transform (FFT) size. Thus, the child IAB node 802 may begin transmission of the uplink signal 808 at the time $T_{TA}$ to account for the propagation delay ($T_p$) between the child IAB node 802 and the parent IAB node 804, thereby enabling the uplink signal 808 to be received at the expected BHRx$_U$ of the parent IAB node 804.

The child IAB node 802 may further utilize the downlink reception time (BHRx$_D$) of the downlink signals 806 and 810 and the TA value to determine the downlink transmission time (ATx$_D$) of a downlink signal 812 transmitted to one or more scheduled entities (e.g., UEs or other IAB nodes) of the child IAB node. For example, the downlink transmission time (ATx$_D$) may be expressed as:

$$ATx_D = BHRx_D - T_p = \quad \text{(Equation 6)}$$
$$BHRx_D - \frac{N_{TA}}{2} + \frac{\Delta}{2} = BHRx_D - \left(\frac{TA}{2} + T_{delta}\right),$$

where:

$$T_{delta} = -G_{Rx22Tx}/2. \quad \text{(Equation 7)}$$

Therefore, the child IAB node 802 may set the downlink transmission time (ATx$_D$) ahead of the downlink reception time (BHRx$_D$) by TA/2+$T_{delta}$ to align the downlink transmission time (ATx$_D$) with the downlink transmission time (BHTx$_D$).

The parent IAB node 804 may signal the $N_{TA, offset}$ (and, in some examples, the $T_{delta}$) to the child IAB node 802 to facilitate proper alignment of uplink transmissions and downlink transmissions. In addition, when the parent IAB node 804 and/or child IAB node 802 are mobile, the parent IAB node 804 may further transmit the TA command including the TA value to the child IAB node 802 not only at initial access (e.g., during a random access procedure), but also upon detecting a change in RTT, thus creating increased signaling on backhaul links. In addition, the child IAB node 802 may experience temporary misalignment during periods between TA commands.

In various aspects of the disclosure, the child IAB node 802 may monitor the downlink reception timing (e.g., BHRx$_D$) of backhaul downlink signals from the parent IAB node 802 and autonomously adjust the uplink transmission timing based on a change in the downlink reception timing (BHRx$_D$). For example, the child IAB node 802 may observe a change in the BHRx$_D$ by a reception timing difference. Here, the reception timing difference corresponds to a difference between an expected BHRx$_D$ and an actual BHRx$_D$. The child IAB node 802 may then autonomously adjust the uplink transmission timing by a transmission timing difference to compensate for the change in BHRx$_D$. In some examples, the transmission timing difference may be equal to the negative of twice the reception timing difference.

In some examples, the child IAB node 802 may operate in an open loop mode to determine the uplink transmission timing without first receiving TA commands. In this example, the child IAB node 802 may determine the skew between the downlink and uplink timing and utilize the skew and the change in downlink reception timing to adjust the uplink transmission timing. Here, the skew between downlink and uplink timing may be determined from $N_{TA, offset}$ and $T_{delta}$. In this example, the parent IAB node 804 may transmit $T_{delta}$ or $\Delta$ in addition to $N_{TA, offset}$ to the child IAB node 802. In other examples, the child IAB node 802 may operate in a tracking mode to receive one or more TA commands to initially set the uplink transmission timing. The child IAB node 802 may then further adjust the uplink transmission timing based on the observed reception timing difference. For example, the child IAB node 802 may autonomously adjust the timing advance value by the transmission timing difference.

Figure 9:
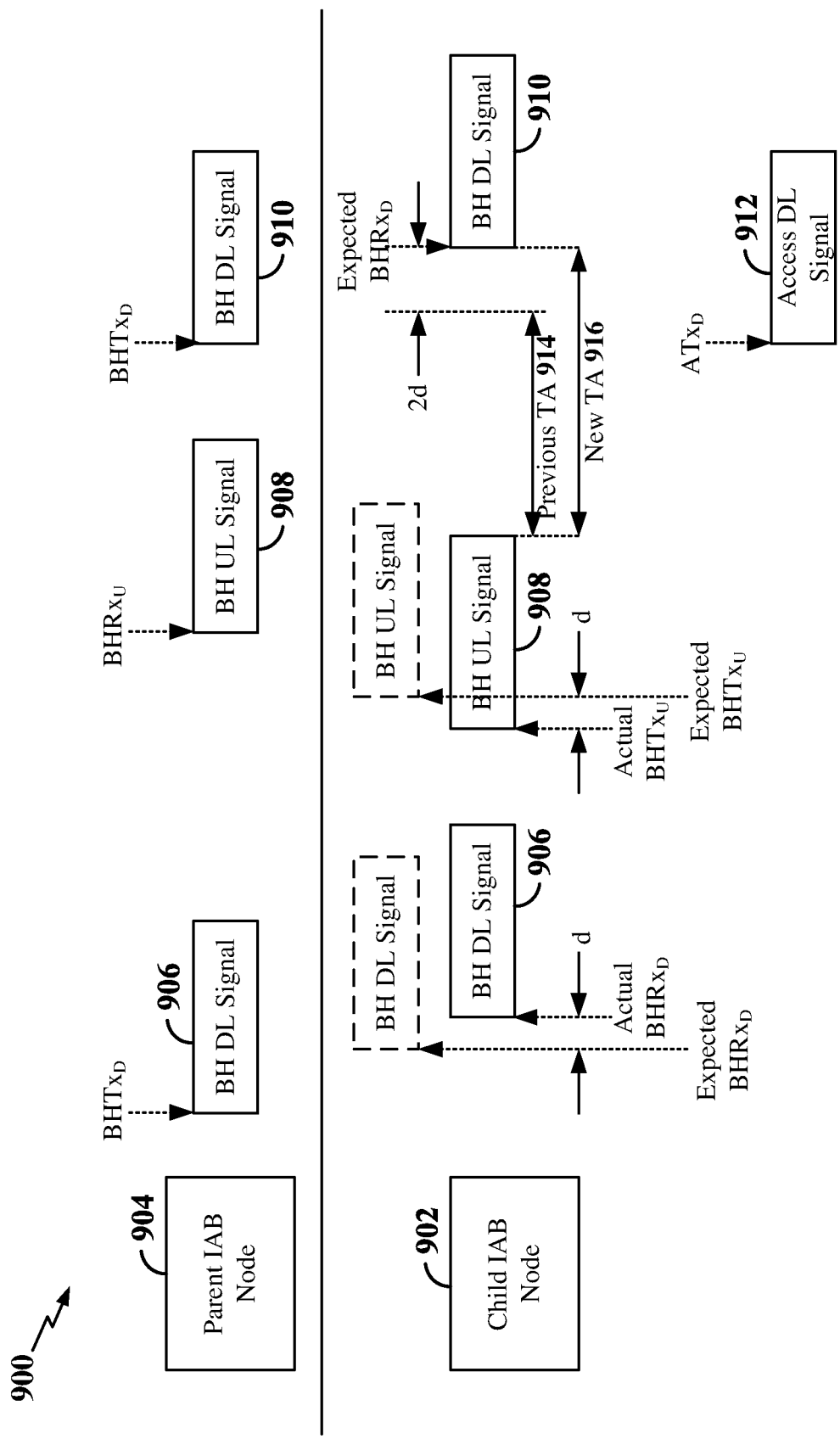
FIG. 9 is a diagram illustrating an example of autonomous adjustment of the uplink transmission timing in an IAB network.

FIG. 9 illustrates an example of autonomous adjustment of the uplink transmission timing in an IAB network 900. In the example shown in FIG. 9, a child IAB node 902 (e.g., an MT unit of an IAB node) is in wireless communication with a parent IAB node 904 (e.g., a DU of an IAB node) over a backhaul link Each IAB node 902 and 904 may correspond, for example, to any of the IAB nodes illustrates in FIG. 4 or 5.

In the example shown in FIG. 9, the parent IAB node 904 transmits a backhaul downlink (BH DL) signal 906 at a downlink transmission time (BHTx$_D$). Based on the downlink reception timing of previously transmitted BH DL signals, the child IAB node 902 expects to receive the BH DL signal 906 at an expected downlink reception time (Expected BHRx$_D$). However, the child IAB node 902 receives the BH DL signal 906 at an actual downlink reception time (Actual BHRx$_D$). The child IAB node 902 may calculate the downlink reception timing difference (d) between the Expected BHRx$_D$ and the Actual BHRx$_D$ and apply the downlink reception timing difference (d) to other BH DL signals (e.g., BH DL signal 910) received by the child IAB node 902. For example, the child IAB node 902 may utilize the Actual BHRx$_D$ in estimating the Expected BHRx$_D$ for the BH DL signal 910.

In addition, the child IAB node 902 may further utilize the downlink reception timing difference (d) to determine the uplink transmission timing of backhaul uplink (BH UL) signals (e.g., BH UL signal 908) transmitted from the child IAB node 902 to the parent IAB node 904. In some examples, the child IAB node 902 may autonomously adjust the uplink transmission timing of the BH UL signal 908 by a transmission timing difference equal to the negative of twice the reception timing difference (−2d). In this example, the child IAB node 902 may autonomously adjust the uplink transmission time of the BH UL signal 908 from an expected uplink transmission time (Expected BHTx$_U$) to an actual uplink transmission time (Actual BHTx$_U$) based on the Expected BHRx$_D$ of BH DL signal 910 and the transmission timing difference (2d). In the example shown in FIG. 9, the child IAB node 902 may advance the Actual BHTx$_U$ of BH UL signal 908 by 2$d$ from the Expected BHRx$_D$. Thus, the difference between the Actual BHTx$_U$ and the Expected BHTx$_U$ of the BH UL signal 908 may be equal to d.

In some examples, as shown in FIG. 9, the child IAB node 902 may operate in a tracking mode to autonomously adjust a previously received TA value 914 to a new TA value 916 based on the change in BHRx$_D$ (e.g., the difference between the Expected BHRx$_D$ and the Actual BHRx$_D$). In this example, the child IAB node 902 may reduce misalignment of the backhaul uplink transmission timing, thus reducing interference and/or improving resource utilization in the IAB network 900. In addition, the parent IAB node 904 may transmit TA values with reduced frequency, thus reducing the signaling overhead in the IAB network 900. In other examples, the child IAB node 902 may operate in an open-loop mode to autonomously determine the uplink transmission timing (e.g., corresponding to a TA value) from the known skew between uplink and downlink timing (e.g., $N_{TA, offset}$ and $T_{delta}$) and the change in BHRx$_D$. In this example, the signaling overhead in the IAB network 900 may be reduced since the TA command is not transmitted from the parent IAB node 904 to the child IAB node 902. In addition, the resources that would have been allocated to receiving TA commands may be re-assigned for other purposes, such as communication with scheduled entities (e.g., UEs and other IAB nodes) of the child IAB node 902.

In addition, the child IAB node 902 may further maintain the downlink transmission timing ($ATx_D$) for downlink signals (e.g., access DL signal 912) transmitted to one or more scheduled entities (e.g., UEs or other IAB nodes) of the child IAB node 902 irrespective of a change in the downlink reception timing. Therefore, the amount of processing performed by the child IAB node 902 may be reduced, thus improving the performance of the child IAB node 902.

In some examples, the child IAB node 902 may be configured to operate in either a normal time adjustment mode (e.g., as shown in FIG. 8) or in an autonomous time adjustment mode (e.g., as shown in FIG. 9). The child IAB node 902 may further be configured to enter the autonomous time adjustment mode based upon one or more criteria related to the internal timing reference within the child IAB node 902. For example, the child IAB node 902 may track the downlink transmission timing (e.g., $BHTx_D$) within the IAB network 900 from the parent IAB node 904 to lock its internal timing reference to the common downlink transmission timing in the IAB network 900. In some examples, the child IAB node 902 may track $\Delta$ or $T_{delta}$, and with knowledge of the $N_{TA, offset}$ and the $G_p$, lock to the common downlink transmission timing in the IAB network. When the internal timing reference of the child IAB node 902 is adequately locked to the common downlink transmission timing in the IAB network 900, the child IAB node 902 is able to maintain the access downlink transmission timing without updating the downlink transmission timing based on the backhaul downlink reception timing while in the autonomous time adjustment mode. In addition, the child IAB node 902 is able to apply the transmission timing difference to the uplink transmission timing without receiving updated TA commands from the parent IAB node 904 while in the autonomous time adjustment mode.

In some examples, the child IAB node 902 may enter the autonomous time adjustment mode after tracking the downlink transmission timing for a period of time greater than or equal to a threshold. The minimum time interval (threshold) for tracking the common downlink transmission timing may be preconfigured or determined by the parent IAB node 904 or the IAB donor node central unit.

In some examples, the child IAB node 902 may further synchronize its internal timing reference with one or more synchronization sources and enter the autonomous time adjustment mode based upon one or more additional criteria. The synchronization sources may include, for example, one or more of the parent IAB node 904, a neighboring IAB node (e.g., an IAB node with a cell coverage area adjacent to or overlapping the child IAB node cell coverage area), a nearby base station operating at a different carrier frequency (e.g., a sub-6 GHz gNB with a cell coverage area adjacent to or overlapping the child IAB node cell coverage area), or an internal global navigation satellite system (GNSS), such as a global positioning system (GPS). Examples of additional criteria may include, but are not limited to, the number of different synchronization sources utilized by the child IAB node 902, the respective link quality between the child IAB node 902 and one or more synchronization sources, a respective confidence metric associated with each of the synchronization sources, or a respective mobility state of the child IAB node 902 and/or parent IAB node 904 (e.g., whether the child IAB node 902 and/or parent IAB node 904 are mobile).

For example, the child IAB node 902 may measure the signal-to-interference-plus-noise (SINR) of reference signals received from the parent IAB node 904, neighboring IAB nodes, or nearby base stations to determine the respective link quality with each of these synchronization sources. From the link quality, the child IAB node 902 may determine the reliability of the synchronization source, and therefore, ascertain the reliability of its internal timing reference synchronized to the synchronization source. As an example, if the measured SINR associated with at least one synchronization source is above a threshold, the child IAB node 902 may enter the autonomous time adjustment mode as long as other criteria utilized by the child IAB node 902 are also met. Each synchronization source may further advertise its respective confidence metric to the child IAB node 902, which may be utilized by the child IAB node 902 to determine the reliability of the synchronization source. The confidence metric may indicate a timing confidence associated with the synchronization source. For example, the confidence metric may indicate whether the synchronization source is directly synchronized by a GNSS/GPS or other reliable network clock, indirectly synchronized by a reliable network clock, or synchronized by another mechanism.

In some examples, the child IAB node 902 may determine an overall confidence level related to its internal timing reference from one or more of the additional criteria and/or the elapsed tracking time criteria. The overall confidence level may indicate, for example, a confidence in the correspondence between the child IAB node downlink transmission timing and the common downlink transmission timing in the IAB network as a measure of whether the child IAB node has adequately locked onto the common downlink transmission timing. The child IAB node 902 may then enter the autonomous time adjustment mode when the overall confidence level is above a threshold. The overall confidence level (or other individual criteria levels) may be preconfigured or determined by the parent IAB node 904 or IAB donor node central unit.

In some examples, the child IAB node 902 may directly enter the autonomous time adjustment mode. In other examples, the parent IAB node 904 and/or the IAB donor node central unit may request or instruct the child IAB node 902 to enter the autonomous time adjustment mode based upon the elapsed tracking time reported by the child IAB node 902 and/or one or more of the additional criteria, such as the synchronization source criteria, reported by the child IAB node 902 and/or reported by the synchronization sources themselves (e.g., the confidence metrics). It should be understood that the autonomous adjustment of uplink transmission timing shown in FIG. 9 is not limited to IAB networks, but instead may also be utilized in single hop configurations between, for example, a scheduling entity (e.g., a base station) and a scheduled entity (e.g., a UE) in a wireless communication network.

Figure 10:
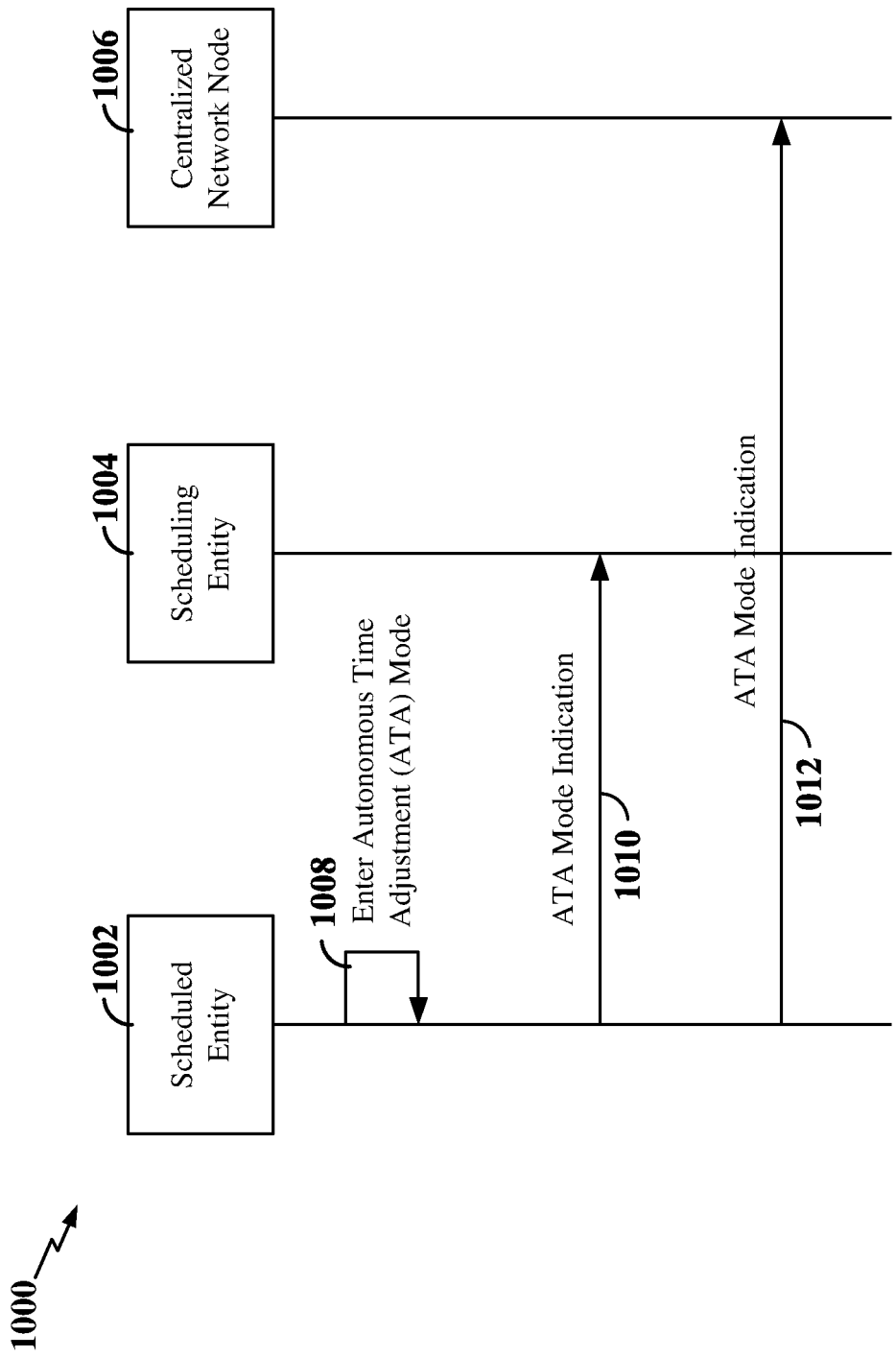
FIG. 10 is a diagram illustrating exemplary signaling for autonomous time adjustment in a wireless communication network.

FIG. 10 is a diagram illustrating exemplary signaling for autonomous time adjustment in a wireless communication network 1000. In the example shown in FIG. 10, a scheduled entity (e.g., a UE or child IAB node) 1002 is in wireless communication with a scheduling entity (e.g., a base station or parent IAB node) 1004 and a centralized network node (e.g., an IAB donor node central unit) 1006 over access and/or backhaul links. The scheduled entity 1002 may correspond, for example, to any of the scheduled entities illustrated in FIGS. 1, 2, 4, and 5. The scheduling entity 1004 may correspond, for example, to any of the scheduling entities illustrated in FIGS. 1, 2, 4, and 5. The centralized network node 1006 may correspond, for example, to the IAB donor node central unit illustrated in FIGS. 4 and 5.

In the example shown in FIG. 10, the scheduled entity 1002 renders the decision on whether to enter the autonomous time adjustment (ATA) mode based on one or more criteria related to its internal timing reference, as discussed above. At 1008, the scheduled entity 1002 may then enter the ATA mode, and at 1010, the scheduled entity may transmit an ATA mode indication to the scheduling entity 1004 notifying the scheduling entity 1004 that the scheduled entity 1002 has entered the ATA mode. The ATA mode indication may be transmitted, for example, via uplink control information (UCI), via a specific random access channel (RACH) message, or via an uplink medium access control-control element (MAC-CE). Upon receiving the ATA mode indication, the scheduling entity 1004 may preclude or otherwise reduce transmission of TA commands to the scheduled entity 1002. At 1012, the scheduled entity 1002 may further transmit an ATA mode indication to the centralized network node 1006 via, for example, a radio resource control (RRC) message.

Figure 11:
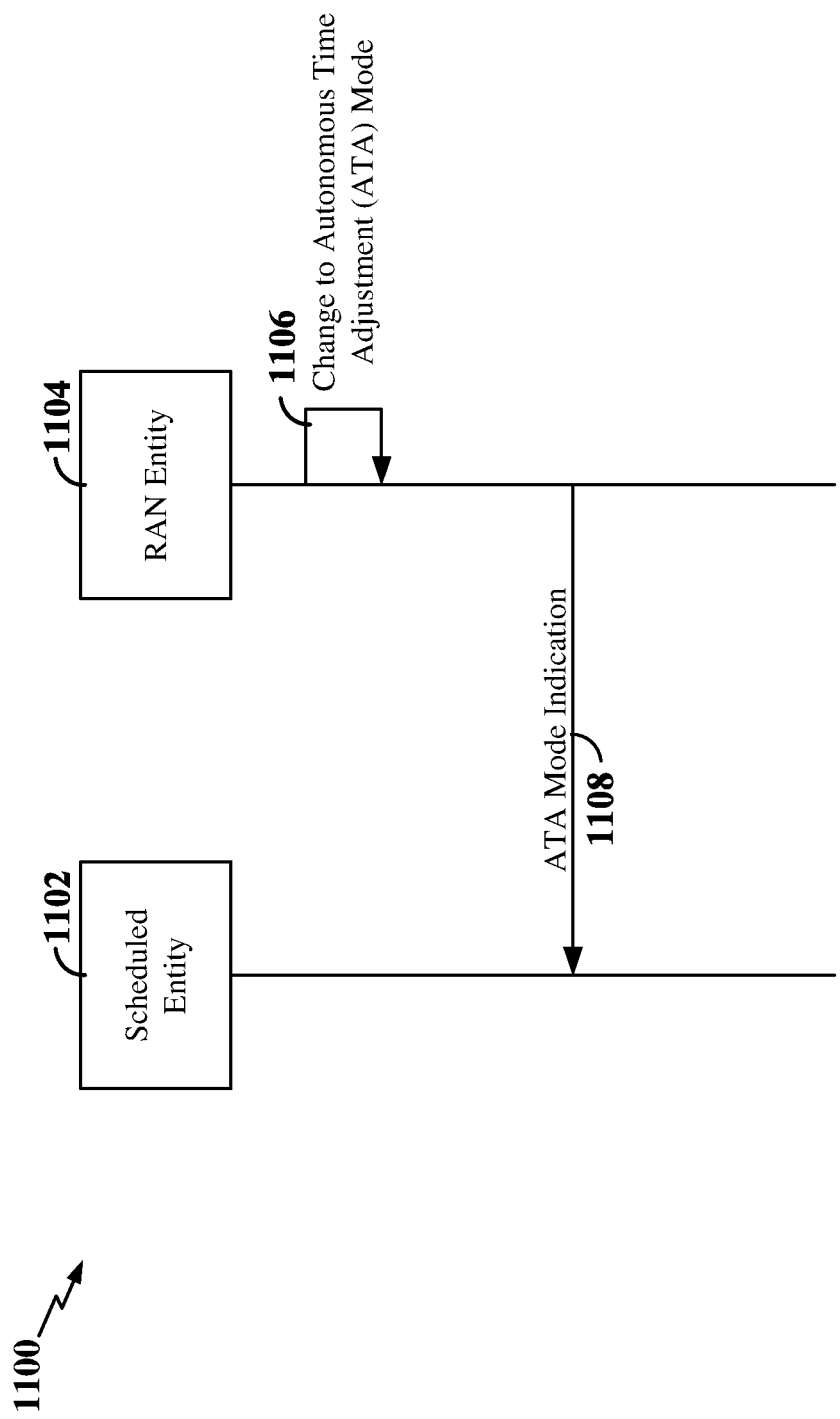
FIG. 11 is a diagram illustrating other exemplary signaling for autonomous time adjustment in a wireless communication network.

FIG. 11 is a diagram illustrating other exemplary signaling for autonomous time adjustment in a wireless communication network 1100. In the example shown in FIG. 11, a scheduled entity (e.g., a UE or child IAB node) 1102 is in wireless communication with a radio access network (RAN) entity (e.g., a base station, parent IAB node, or IAB donor node central unit) 1104 over access or backhaul links. The scheduled entity 1102 may correspond, for example, to any of the scheduled entities illustrated in FIGS. 1, 2, 4, and 5. The RAN entity 1104 may correspond, for example, to any of the scheduling entities illustrated in FIGS. 1, 2, 4, and 5. The RAN entity 1104 may further correspond, for example, to the IAB donor node central unit illustrated in FIGS. 4 and 5.

In the example shown in FIG. 11, the RAN entity 1104 renders the decision on whether to enter the autonomous time adjustment (ATA) mode based on one or more criteria related to the internal timing reference of the scheduled entity 1102, as discussed above. At 1106, the RAN entity 1104 may change the scheduled entity 1102 to the ATA mode, and at 1108, transmit an ATA mode indication to the scheduled entity 1102 requesting/instructing the scheduled entity 1102 to enter the ATA mode. In examples in which the scheduling entity changes the scheduled entity to the ATA mode, the ATA mode indication may be transmitted, for example, via Layer 1 signaling (e.g., via downlink control information (DCI)), or via a downlink medium access control-control element (MAC-CE). In examples in which the centralized network node changes the scheduled entity to the ATA mode, the ATA mode indication may be transmitted via, for example, RRC signaling. Upon changing the scheduled entity 1102 to the ATA mode indication, the RAN entity 1104 may preclude or otherwise reduce transmission of TA commands to the scheduled entity 1102.

Figure 12:
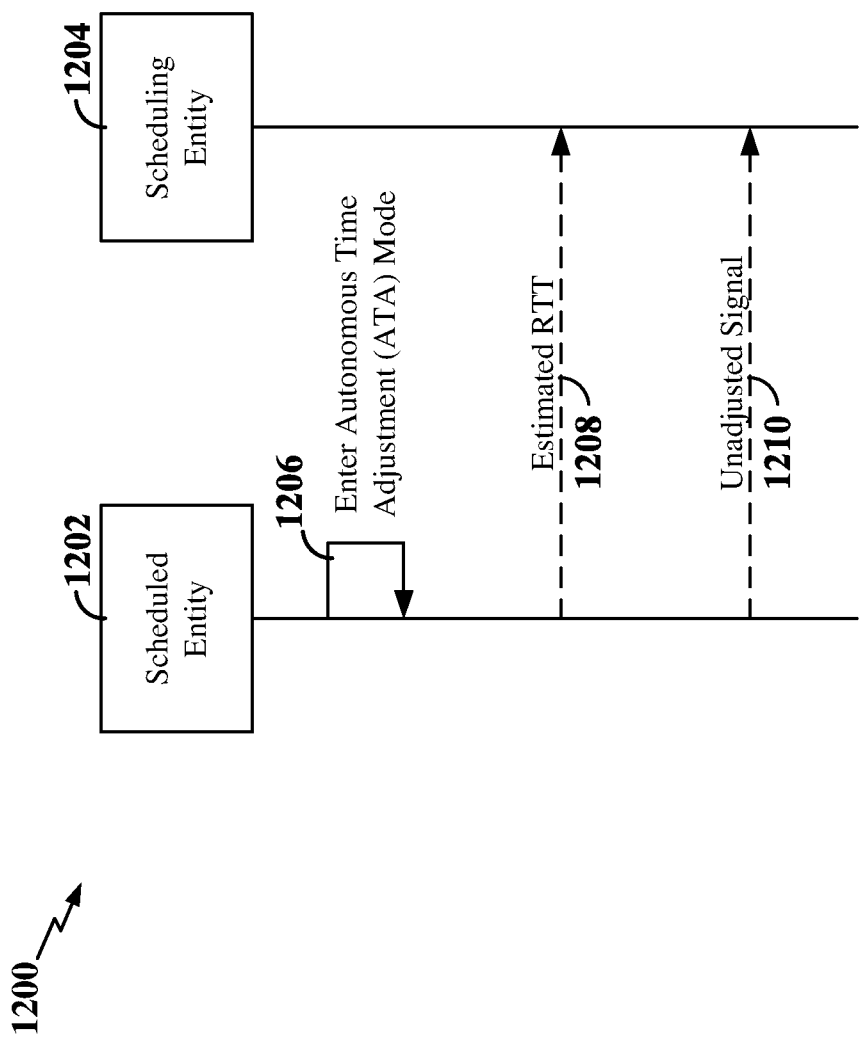
FIG. 12 is a diagram illustrating other exemplary signaling for autonomous time adjustment in a wireless communication network.

FIG. 12 is a diagram illustrating other exemplary signaling for autonomous time adjustment in a wireless communication network 1200. In the example shown in FIG. 12, a scheduled entity (e.g., a UE or child IAB node) 1202 is in wireless communication with a scheduling entity (e.g., a base station or parent IAB node) 1204 over an access or backhaul link. The scheduled entity 1202 may correspond, for example, to any of the scheduled entities illustrated in FIGS. 1, 2, 4, and 5. The scheduling entity 1204 may correspond, for example, to any of the scheduling entities illustrated in FIGS. 1, 2, 4, and 5.

At 1206, the scheduled entity 1202 enters the ATA mode. The scheduled entity 1202 may determine to enter ATA mode based on one or more criteria, as discussed above, or may enter the ATA mode in response to receiving an instruction from the scheduling entity 1204 or a centralized network node. Once the scheduled entity 1202 enters the ATA mode, the scheduled entity 1202 may autonomously adjust the backhaul uplink transmission timing of uplink signals communicated to the scheduling entity 1204. As a result, the scheduling entity 1204 may not have knowledge of the updated RTT of communications between the scheduling entity 1204 and the scheduled entity 1202, which may affect other procedures, such as positioning of the scheduled entity 1202 and/or scheduling entity 1204.

Therefore, at 1208, the scheduled entity 1202 may optionally estimate the RTT based on the transmission timing difference and transmit the estimated RTT to the scheduling entity 1204 for use thereof in other procedures. For example, the scheduled entity 1202 may transmit the estimated RTT within an uplink MAC-CE. In some examples, the scheduled entity 1202 may transmit the estimated RTT to the scheduling entity 1204 periodically, aperiodically (e.g., as requested by the scheduling entity 1204) or upon the occurrence of a triggering event. For example, the triggering event may include at least one of an expiration of a timer or an accumulated transmission timing difference exceeding a threshold.

Additionally or alternatively, at 1210, the scheduled entity 1202 may optionally transmit at least one unadjusted uplink signal with unadjusted uplink transmission timing to the scheduling entity 1204. The unadjusted uplink signal may be transmitted with the uplink transmission timing prior to adjusting (e.g., prior to applying the transmission timing difference to the uplink transmission timing). The scheduling entity 1204 may then utilize the unadjusted uplink signal to measure and update the RTT. In some examples, the scheduled entity 1202 may transmit the unadjusted uplink signal to the scheduling entity 1204 periodically, aperiodically (e.g., as requested by the scheduling entity 1204) or upon the occurrence of a triggering event. For example, the triggering event may include at least one of an expiration of a timer or an accumulated transmission timing difference exceeding a threshold.

Figure 13:
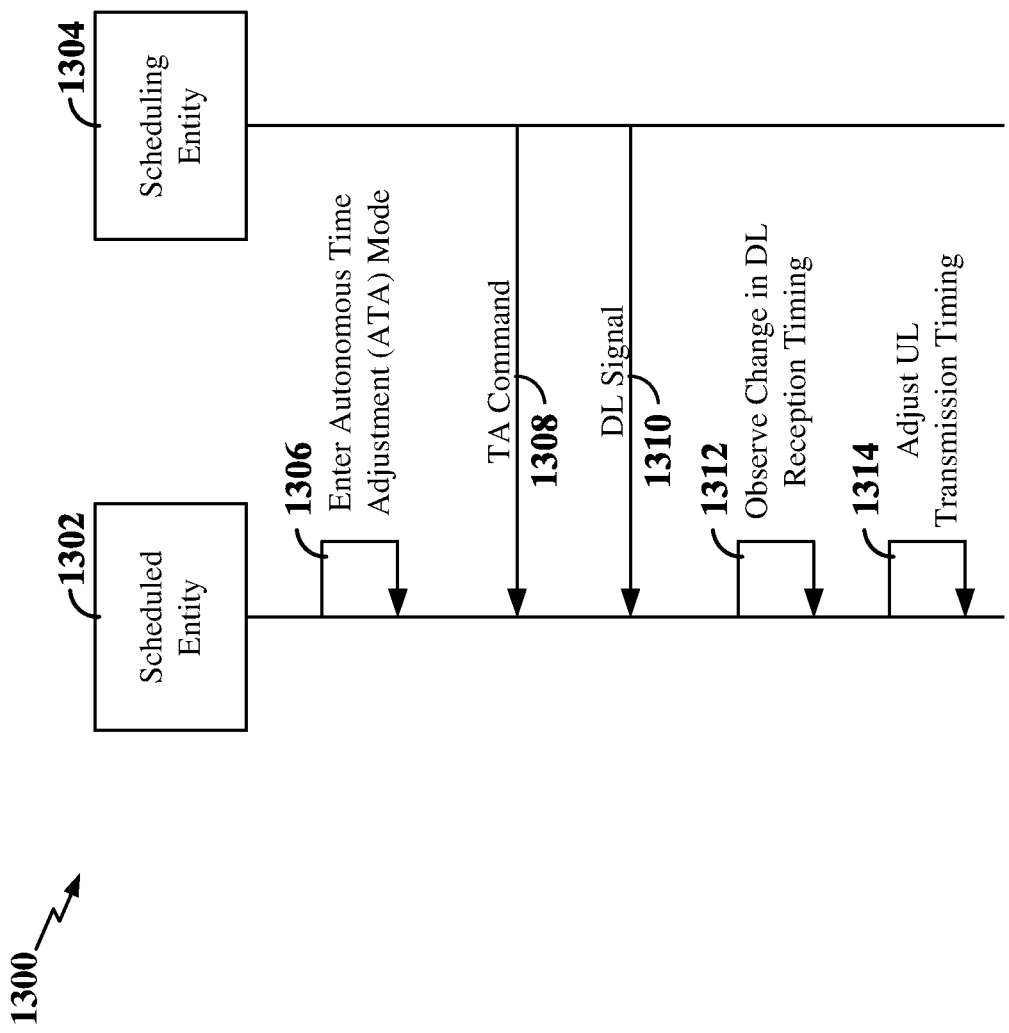
FIG. 13 is a diagram illustrating other exemplary signaling for autonomous time adjustment in a wireless communication network.

FIG. 13 is a diagram illustrating other exemplary signaling for autonomous time adjustment in a wireless communication network 1300. In the example shown in FIG. 13, a scheduled entity (e.g., a UE or child IAB node) 1302 is in wireless communication with a scheduling entity (e.g., a base station or parent IAB node) 1304 over an access or backhaul link. The scheduled entity 1302 may correspond, for example, to any of the scheduled entities illustrated in FIGS. 1, 2, 4, and 5. The scheduling entity 1304 may correspond, for example, to any of the scheduling entities illustrated in FIGS. 1, 2, 4, and 5.

In the example shown in FIG. 13, the scheduled entity 1302 may be operating in a tracking mode to track changes to the TA value while in the ATA mode. For example, at 1306, the scheduled entity 1302 may enter the ATA mode (e.g., either directly or in response to an instruction from the scheduling entity 1304 or centralized network node). At 1308, the scheduled entity 1302 may then receive a TA command including a TA value from the scheduling entity 1304. The scheduled entity 1302 may utilize the TA value to set the initial uplink transmission timing in the scheduled entity 1302. At 1310, the scheduled entity may then receive a backhaul downlink (DL) signal from the scheduling entity 1304, and at 1312, observe a change in backhaul DL reception timing based on the DL signal (e.g., by observing a difference between an expected DL reception time of the DL signal and an actual DL reception time of the DL signal).

At 1314, the scheduled entity 1302 may then adjust the backhaul uplink transmission timing based on the observed change. For example, the scheduled entity 1302 may discern the reception timing difference (e.g., the difference between the expected DL reception timing and the actual DL reception timing) and calculate the transmission timing difference as the negative of twice the reception timing difference. The scheduled entity 1302 may then autonomously adjust the TA value by the transmission timing difference to set the new uplink transmission timing.

Figure 14:
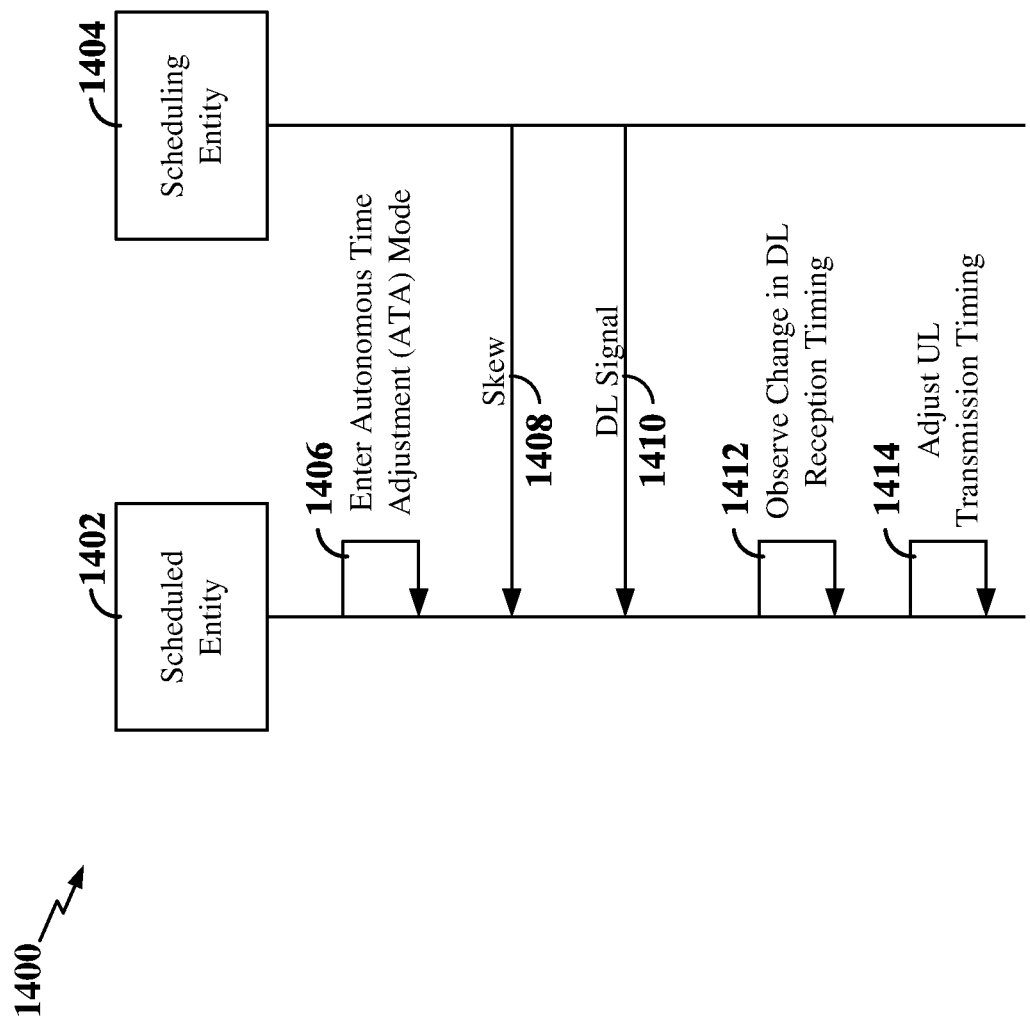
FIG. 14 is a diagram illustrating other exemplary signaling for autonomous time adjustment in a wireless communication network.

FIG. 14 is a diagram illustrating other exemplary signaling for autonomous time adjustment in a wireless communication network 1400. In the example shown in FIG. 14, a scheduled entity (e.g., a UE or child IAB node) 1402 is in wireless communication with a scheduling entity (e.g., a base station or parent IAB node) 1404 over an access or backhaul link. The scheduled entity 1402 may correspond, for example, to any of the scheduled entities illustrated in FIGS. 1, 2, 4, and 5. The scheduling entity 1404 may correspond, for example, to any of the scheduling entities illustrated in FIGS. 1, 2, 4, and 5.

In the example shown in FIG. 14, the scheduled entity 1402 may be operating in an open loop mode while in the ATA mode. For example, at 1406, the scheduled entity 1402 may enter the ATA mode (e.g., either directly or in response to an instruction from the scheduling entity 1404 or centralized network node). At 1408, the scheduled entity 1402 may then receive an indication of the skew between downlink and uplink timing in the wireless communication network 1400 from the scheduling entity 1404 and/or the centralized network node and may set the initial uplink transmission timing in the scheduled entity 1402 based on the skew. For example, the skew may include the $N_{TA, \text{offset}}$ and $T_{delta}$.

At 1410, the scheduled entity 1402 may receive a backhaul downlink (DL) signal from the scheduling entity 1404, and at 1412, observe a change in backhaul DL reception timing based on the DL signal (e.g., by observing a difference between an expected DL reception time of the DL signal and an actual DL reception time of the DL signal). At 1414, the scheduled entity 1402 may then adjust the backhaul uplink transmission timing based on the observed change. For example, the scheduled entity 1402 may discern the reception timing difference (e.g., the difference between the expected DL reception timing and the actual DL reception timing) and calculate the transmission timing difference as the negative of twice the reception timing difference. The scheduled entity 1402 may then autonomously adjust the initial uplink transmission timing by the transmission timing difference.

Figure 15:
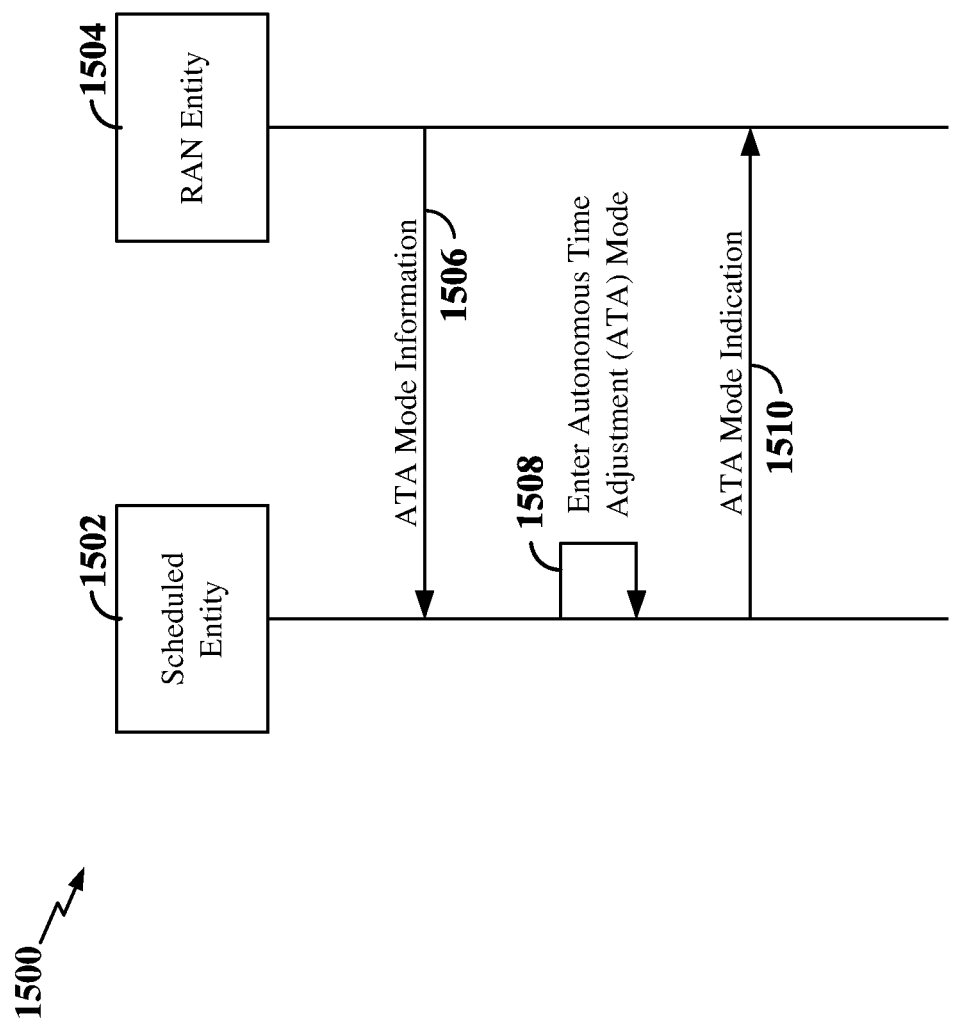
FIG. 15 is a diagram illustrating other exemplary signaling for autonomous time adjustment in a wireless communication network.

FIG. 15 is a diagram illustrating other exemplary signaling for autonomous time adjustment in a wireless communication network 1500. In the example shown in FIG. 15, a scheduled entity (e.g., a UE or child IAB node) 1502 is in wireless communication with a RAN entity (e.g., a base station, parent IAB node, or IAB donor node central unit) 1504 over access and/or backhaul links. The scheduled entity 1502 may correspond, for example, to any of the scheduled entities illustrated in FIGS. 1, 2, 4, and 5. The RAN entity 1504 may correspond, for example, to any of the scheduling entities illustrated in FIGS. 1, 2, 4, and 5. The RAN entity 1504 may further correspond, for example, to the IAB donor node central unit illustrated in FIGS. 4 and 5.

In the example shown in FIG. 15, at 1506, the RAN entity 1504 transmits ATA mode information to the scheduled entity 1502. The ATA mode information may include, for example, one or more parameters (e.g., criteria) configured by the scheduling entity or centralized network node 1506 to be utilized by the scheduled entity 1502 to determine whether to operate in the ATA mode. In some examples, the one or more parameters may include elapsed tracking time criteria indicating an elapsed time (e.g., threshold duration of time) for tracking the downlink transmission timing prior to entering the ATA mode. In some examples, the one or more parameters may include one or more additional criteria, such as the number of different synchronization sources to be utilized by the scheduled entity 1502 prior to entering the ATA mode, the respective link quality between the scheduled entity 1502 and the one or more synchronization sources prior to entering the ATA mode, a respective confidence metric associated with each of the synchronization sources prior to entering the ATA mode, and/or a respective mobility state of the scheduled entity 1502 and/or scheduling entity prior to entering the ATA mode. In some examples, the one or more parameters may include overall confidence level based on one or more of the elapsed tracking time criteria and/or additional criteria.

In some examples, the ATA mode information may further include a configuration of the scheduled entity 1502 to transmit at least one unadjusted uplink signal with unadjusted uplink transmission timing to the scheduling entity (e.g., periodically, aperiodically, or in response to a triggering event) when operating in the ATA mode. In some examples, the ATA mode information may further include a configuration of the scheduled entity 1502 to transmit to the scheduling entity an estimation of a round-trip time (RTT) of communication between the scheduled entity 1502 and the scheduling entity (e.g., periodically, aperiodically, or in response to a triggering event) when operating in the ATA mode.

At 1508, the scheduled entity 1502 renders the decision on whether to enter the ATA mode based on the ATA mode information provided at 1506, as discussed above. At 1510, the scheduled entity 1502 may then transmit an ATA mode indication to the RAN entity 1504 notifying the RAN entity 1504 that the scheduled entity 1502 has entered the ATA mode. The ATA mode indication may be transmitted to the scheduling entity, for example, via UCI, via a specific RACH message, or via an uplink MAC-CE. The ATA mode indication may be transmitted to the centralized network node via, for example, an RRC message. Upon receiving the ATA mode indication, the scheduling entity may preclude or otherwise reduce transmission of TA commands to the scheduled entity 1502.

Figure 16:
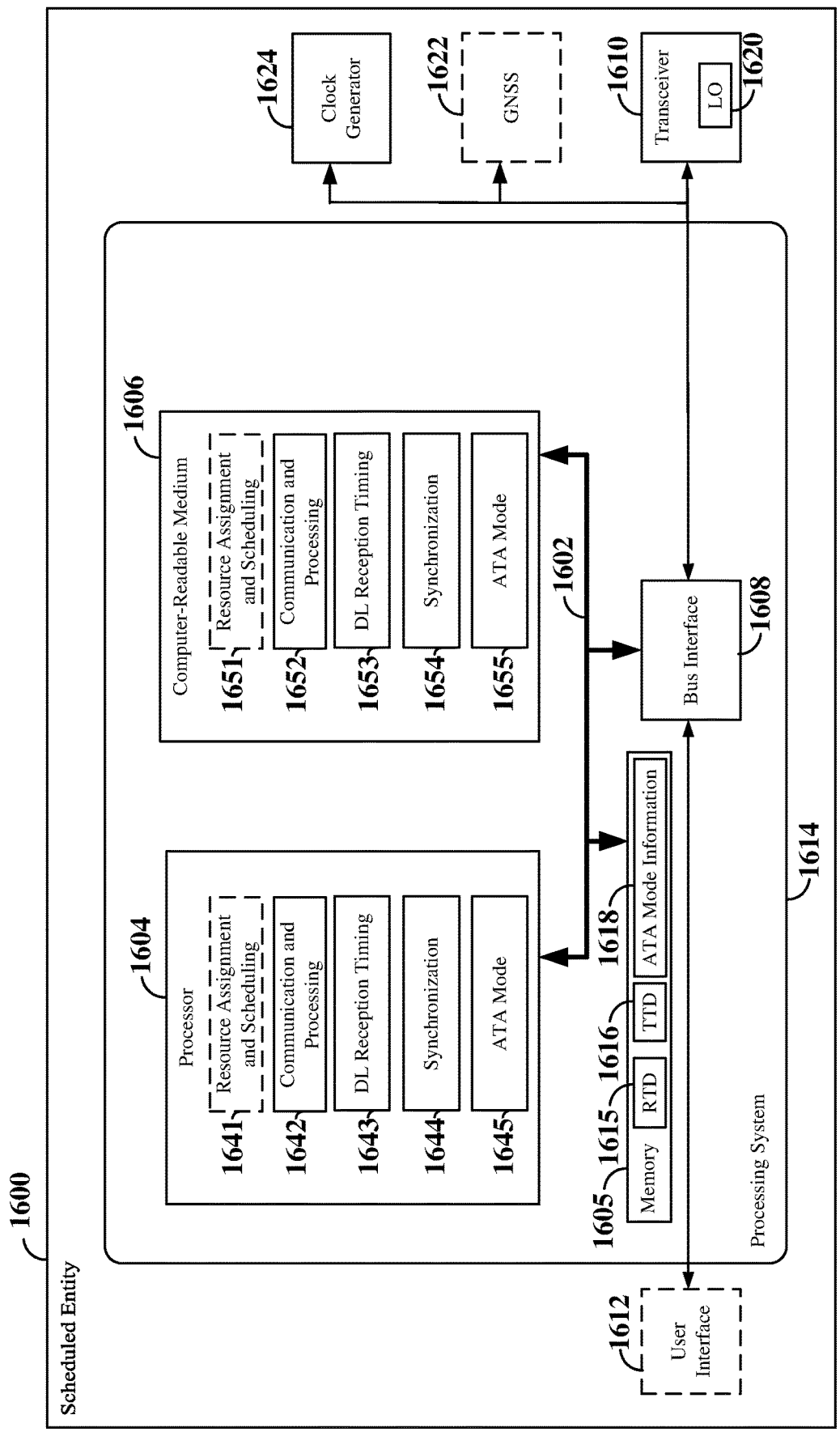
FIG. 16 is a block diagram illustrating an example of a hardware implementation for a scheduled entity employing a processing system.

FIG. 16 is a block diagram illustrating an example of a hardware implementation for a scheduled entity 1600 employing a processing system 1614. For example, the scheduled entity 1600 may be a UE or child IAB node, as illustrated in any one or more of FIGS. 1, 2, and 4-15.

The scheduled entity 1600 may be implemented with a processing system 1614 that includes one or more processors 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 1600 may be configured to perform any one or more of the functions described herein. That is, the processor 1604, as utilized in a scheduled entity 1600, may be used to implement any one or more of the processes and procedures described below.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further. A bus interface 1608 provides an interface between the bus 1602 and a transceiver 1610. The transceiver 1610 provides a communication interface or means for communicating with various other apparatus over a transmission medium (e.g., air). Depending upon the nature of the apparatus, a user interface 1612 (e.g., keypad, display, speaker, microphone, joystick, touchscreen) may also be provided. Of course, such a user interface 1612 is optional, and may be omitted in some examples.

The processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1606.

The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1604 may include circuitry configured for various functions. In examples in which the scheduled entity 1600 is a child IAB node, the processor 1604 may include resource assignment and scheduling circuitry 1641, configured to generate, schedule, and modify a resource assignment or grant of time-frequency resources (e.g., a set of one or more resource elements) to a set of one or more additional scheduled entities of the child IAB node. For example, the resource assignment and scheduling circuitry 1641 may schedule time-frequency resources within a plurality of time division duplex (TDD) and/or frequency division duplex (FDD) slots to carry user data traffic and/or control information to and/or from the set of one or more additional scheduled entities (e.g., UEs or child IAB nodes). Thus, in this example, the resource assignment and scheduling circuitry 1641 may be configured within a DU of an L2 relay IAB node.

In various aspects of the disclosure, the resource assignment and scheduling circuitry 1641 may further be configured to schedule backhaul and/or access downlink transmissions based on a downlink transmission timing. In some examples, the downlink transmission timing may be a common downlink transmission timing throughout the wireless communication network. The resource assignment and scheduling circuitry 1641 may further be configured to execute resource assignment and scheduling software 1651 included on the computer-readable medium 1606 to implement one or more functions described herein.

The processor 1604 may further include communication and processing circuitry 1642, configured to communicate with a scheduling entity (e.g., a base station or parent IAB node). In examples in which the scheduled entity is a child IAB node, the communication and processing circuitry 1642 may further be configured to communicate with the set of one or more additional scheduled entities (e.g., UEs or child IAB nodes). In some examples, the communication and processing circuitry 1642 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1642 may be configured to receive an ATA mode indication message from a scheduling entity (e.g., a base station or parent IAB node via an L1 signal or DL MAC-CE) or a centralized network node (e.g., an IAB donor node central unit via an RRC message) or to transmit the ATA mode indication message to the scheduling entity (e.g., via UCI, a specific RACH or UL MAC-CE) and/or the centralized network node (e.g., via an RRC message). The communication and processing circuitry 1642 may further be configured to receive ATA mode information 1618 from the scheduling entity or the centralized network node including one or more parameters (e.g., elapsed tracking time criteria and/or additional criteria, such as synchronization source criteria) configured by the scheduling entity or the centralized network node to be utilized by the scheduled entity 1600 to determine whether to operate in the autonomous time adjustment mode. In some examples, the ATA mode information 1618 may further include a configuration of the scheduled entity 1600 to transmit an unadjusted signal and/or the estimated RTT to the scheduling entity when operating in the ATA mode. In some examples, the ATA mode information 1618 may include the ATA mode indication message received from the scheduling entity or the centralized network node. The ATA mode information 1618 may be stored, for example, in memory 1605.

The communication and processing circuitry 1642 may further be configured to transmit the estimated RTT and/or unadjusted uplink signal to the scheduling entity. The communication and processing circuitry 1642 may further be configured to receive a TA command and/or skew from the scheduling entity, and to further receive a downlink signal from the scheduling entity for use in adjusting the uplink transmission timing of the scheduled entity 1600.

The communication and processing circuitry 1642 may further be configured to receive one or more reference signals from one or more synchronization sources and to determine the respective link quality (e.g., SINR) of respective links between the scheduled entity and each of the synchronization sources based on the reference signal(s). In addition, the communication and processing circuitry 1642 may further be configured to receive a respective confidence metric advertised by one or more of the synchronization sources. The communication and processing circuitry 1642 may further be configured to execute communication and processing software 1652 included on the computer-readable medium 1606 to implement one or more functions described herein.

The processor 1604 may further include downlink (DL) reception timing circuitry 1643, configured to monitor the actual downlink reception time of a downlink signal from a scheduling entity and to calculate a reception timing difference (RTD) 1615 between the actual downlink reception time and an expected downlink reception time (e.g., based on current downlink reception timing set based on a previously received downlink signal or initially set based on a TA value or known skew between uplink and downlink timing in the wireless communication network). The RTD 1615 may further be stored, for example, in memory 1605 for further processing. The DL reception timing circuitry 1643 may further be configured to execute DL reception timing software 1653 included on the computer-readable medium 1606 to implement one or more functions described herein.

The processor 1604 may further include synchronization circuitry 1644, configured to synchronize a local oscillator (LO) within the transceiver 1610 to the downlink transmission timing in the wireless communication network. In order to synchronize timing, the synchronization circuitry 1644 may be configured to synchronize a clock generator 1624 with one or more synchronization sources and to further track the downlink transmission timing from the scheduling entity using the synchronized clock generator 1624. In some examples, the scheduled entity 1600 may include an optional global navigation satellite system (GNSS) 1622, such as a global positioning system (GPS), and may utilize the GNSS 1622 as a synchronization source for the clock generator 1624. In other examples, the synchronization circuitry 1644 may utilize one or more over-the-air (OTA) synchronization sources, such as the scheduling entity, neighboring scheduling entities (e.g., neighboring IAB node(s) in examples where the scheduled entity is a child IAB node), and/or nearby base stations (e.g., gNBs) operating at different carrier frequencies, to synchronize the clock generator 1624 with the timing of one or more of the other synchronization sources. The synchronization circuitry 1644 may further be configured to execute synchronization software 1654 included on the computer-readable medium 1606 to implement one or more functions described herein.

The processor 1604 may further include autonomous time adjustment (ATA) mode circuitry 1645, configured to enable the scheduled entity 1600 to autonomously adjust the uplink transmission timing in the scheduled entity. In addition, in examples in which the scheduled entity 1600 is a child IAB node, the ATA mode circuitry 1645 is further configured to enable the child IAB node to maintain the same downlink transmission timing (access and/or backhaul).

In some examples, the ATA mode circuitry 1645 may be configured to enter an ATA mode upon receiving an instruction from a scheduling entity or a centralized network node or to enter the ATA mode directly based on one more criteria. In some examples, the ATA mode circuitry 1645 may be configured to directly enter the ATA mode based upon one or more criteria related to a confidence level in the internal timing reference within the scheduled entity 1600. For example, the ATA mode circuitry 1645 may be configured to operate together with the synchronization circuitry 1644 to track the downlink transmission timing (e.g., $\Delta$ or $T_{delta}$) from the scheduling entity over a period of time. When the period of time is greater than or equal to a threshold, the ATA mode circuitry 1645 may enter the ATA mode.

The ATA mode circuitry 1645 may further be configured to evaluate the confidence level in the internal timing reference based on one or more additional criteria. Examples of additional criteria may include, but are not limited to, the number of different synchronization sources utilized by the synchronization circuitry 1644 to synchronize the clock generator 1624, the respective link quality with each of the OTA synchronization sources, a respective confidence metric associated with each of the synchronization sources, and/or a respective mobility state of the scheduled entity 1600 and/or scheduling entity. For example, the ATA mode circuitry 1645 may operate together with the communication and processing circuitry 1642 to measure the SINR of reference signals received from OTA synchronization sources to determine the respective link quality with each of these synchronization sources. From the link quality, the ATA mode circuitry 1645 may be configured to determine the reliability of the synchronization source, and therefore, ascertain the reliability of its internal timing reference (e.g., clock generator 1624) synchronized to the synchronization source. The ATA mode circuitry 1645 may further operate together with the communication and processing circuitry 1642 to receive a respective confidence metric from each OTA synchronization source, which may be utilized by the ATA mode circuitry 1645 to determine the reliability of the synchronization source. The confidence metric may indicate a timing confidence associated with the synchronization source. For example, the confidence metric may indicate whether the synchronization source is directly synchronized by a GNSS/GPS or other reliable network clock, indirectly synchronized by a reliable network clock, or synchronized by another mechanism.

In some examples, the ATA mode circuitry 1645 may be configured to determine an overall confidence level related to the internal timing reference based on one or more of the criteria. The confidence level may indicate, for example, a confidence in the LO 1620 being locked onto the common downlink transmission timing in the wireless communication network. The ATA mode circuitry 1645 may further be configured to enter the ATA mode when the overall confidence level is above a threshold.

Upon entering the ATA mode, the ATA mode circuitry 1645 is further configured to observe a change in the downlink reception timing by the RTD 1615, as indicated by the DL reception timing circuitry 1643. The ATA mode circuitry 1645 is further configured to adjust the uplink transmission timing by a transmission timing difference (TTD) 1616 equal to the negative of twice the RTD 1615. The TTD 1616 may further be stored, for example, in memory 1605 for subsequent use thereof by the communication and processing circuitry 1642 to adjust the uplink transmission timing for transmission of an uplink signal. In some examples, the ATA mode circuitry 1645 may operate in a tracking mode to autonomously adjust a previously received TA value to a new (or updated) TA value based on the TTD 1616. In other examples, the ATA mode circuitry 1645 may operate in an open-loop mode to autonomously determine the uplink transmission timing from the known skew between uplink and downlink timing (e.g., $N_{TA,\ offset}$ and $T_{delta}$), as received from the communication and processing circuitry 1642, and the TTD 1616.

In examples in which the scheduled entity 1600 is a child IAB node, the ATA mode circuitry 1645 may further be configured to maintain the current downlink transmission timing of downlink signals to one or more additional scheduled entities (e.g., UEs or child IAB nodes) of the scheduled entity 1600 in response to (or irrespective of) the change in the downlink reception timing. The current downlink transmission timing may be maintained as a result of the synchronization circuitry 1644 locking the LO 1620 onto the common downlink transmission timing of the wireless communication network. The ATA mode circuitry 1645 may further be configured to execute ATA mode software 1655 included on the computer-readable medium 1606 to implement one or more functions described herein.

Figure 17:
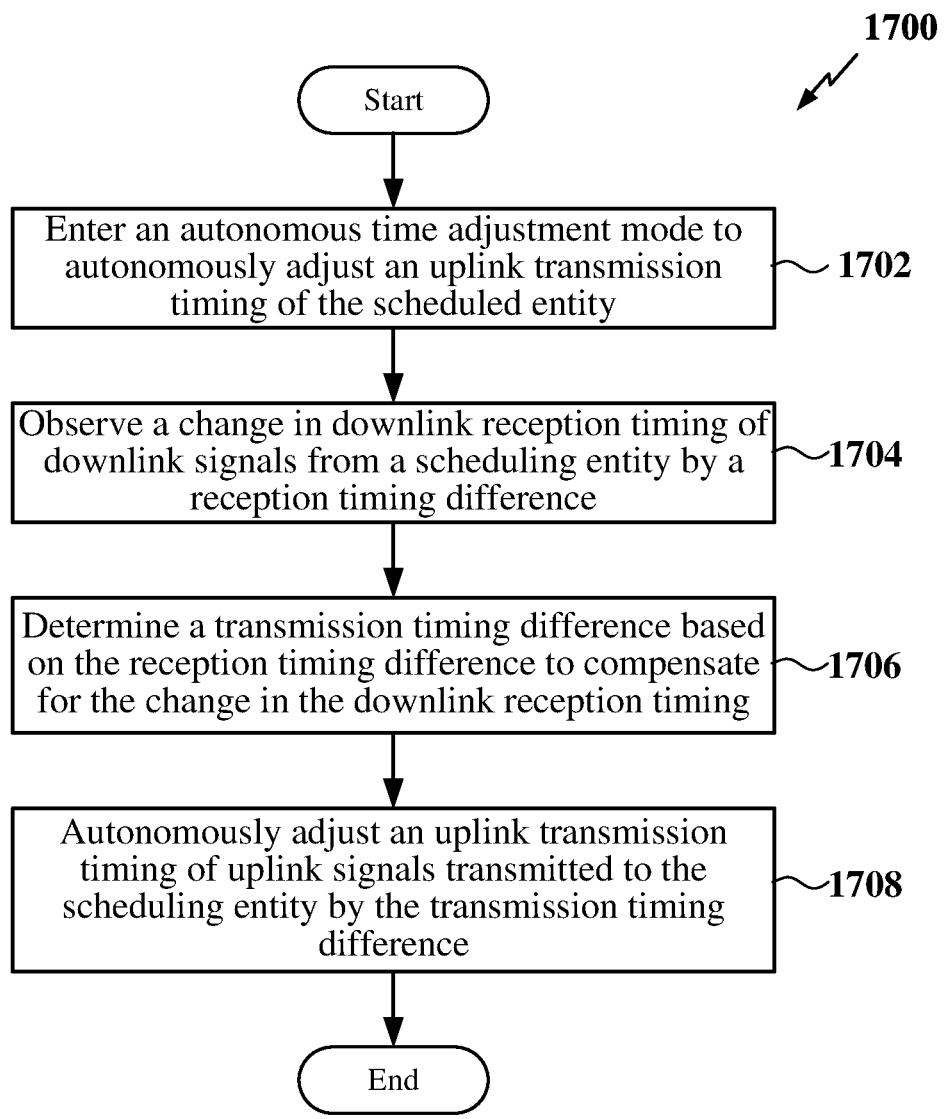
FIG. 17 is a flow chart illustrating an exemplary process for autonomous adjustment of the uplink transmission timing.

FIG. 17 is a flow chart illustrating a process 1700 for autonomous time adjustment in a wireless communication network according to some aspects of the disclosure. As described below, some or all illustrated features may be omitted in a particular implementation within the scope of the present disclosure, and some illustrated features may not be required for implementation of all embodiments. In some examples, the process 1700 may be carried out by the scheduled entity illustrated in FIG. 16. In some examples, the process 1700 may be carried out by any suitable apparatus or means for carrying out the functions or algorithm described below.

At block 1702, the scheduled entity (e.g., a UE or child IAB node) may enter autonomous time adjustment (ATA) mode to autonomously adjust an uplink transmission timing thereof. In some examples, the scheduled entity may receive an instruction from a scheduling entity or centralized network node to enter the ATA mode. In other examples, the scheduled entity may determine to enter the ATA mode based on one or more criteria related to its internal timing reference. For example, the ATA mode circuitry 1645 shown and described above in connection with FIG. 16 may enter the ATA mode.

At block 1704, the scheduled entity may observe a change in downlink reception timing of downlink signals from a scheduling entity (e.g., a base station or parent IAB node) by a reception timing difference. For example, the reception timing difference may correspond to the difference between an expected downlink reception time of a downlink signal received from the scheduling entity and an actual downlink reception time of the downlink signal. The DL reception timing circuitry 1643 and ATA mode circuitry 1645 shown and described above in connection with FIG. 16 may observe the change in downlink reception timing.

At block 1706, the scheduled entity may determine a transmission timing difference based on the reception timing difference to compensate for the change in the downlink reception timing. In some examples, the transmission timing difference may be equal to the negative of twice the reception timing difference. For example, the ATA mode circuitry 1645 shown and described above in connection with FIG. 16 may determine the transmission timing difference.

At block 1708, the scheduled entity may autonomously adjust an uplink transmission timing by the transmission timing difference. In some examples, the scheduled entity may operate in a tracking mode to autonomously adjust a previously received TA value to a new (or updated) TA value based on the transmission timing difference. In other examples, the scheduled entity may operate in an open-loop mode to autonomously determine the uplink transmission timing from the known skew between uplink and downlink timing (e.g., $N_{TA,\ offset}$ and $T_{delta}$) and the transmission timing difference. For example, the ATA mode circuitry 1645 shown and described above in connection with FIG. 16 may autonomously adjust the uplink transmission timing.

In one configuration, a scheduled entity includes means for entering an autonomous time adjustment mode to autonomously adjust an uplink transmission timing of the scheduled entity, means for observing a change in downlink reception timing of downlink signals received from a scheduling entity by a reception timing difference, means for determining a transmission timing difference based on the reception timing difference to compensate for the change in the downlink reception timing, and means for autonomously adjusting the uplink transmission timing of uplink signals transmitted to the scheduling entity by the transmission timing difference.

In one aspect, the aforementioned means for entering the autonomous time adjustment mode, means for observing the change in downlink reception timing of downlink signals received from the scheduling entity by the reception timing difference, means for determining the transmission timing difference based on the reception timing difference to compensate for the change in the downlink reception timing, and means for autonomously adjusting the uplink transmission timing of uplink signals transmitted to the scheduling entity by the transmission timing difference may be the processor(s) 1604 shown in FIG. 16 configured to perform the functions recited by the aforementioned means.

For example, the aforementioned means for entering the autonomous time adjustment mode may include the ATA mode circuitry 1645 shown in FIG. 16. As another example, the aforementioned means for observing the change in downlink reception timing may include the DL reception timing circuitry 1643 and ATA mode circuitry 1645 shown in FIG. 16. In another example, the aforementioned means for determining the transmission timing difference and the means for autonomously adjusting the uplink transmission timing may include the ATA mode circuitry 1645 shown in FIG. 16.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 2, 4, 5, and/or 10-15, and utilizing, for example, the processes and/or algorithms described herein in relation to FIG. 17. In another aspect, the aforementioned means may be a circuit or any apparatus configured to perform the functions recited by the aforementioned means.

Figure 18:
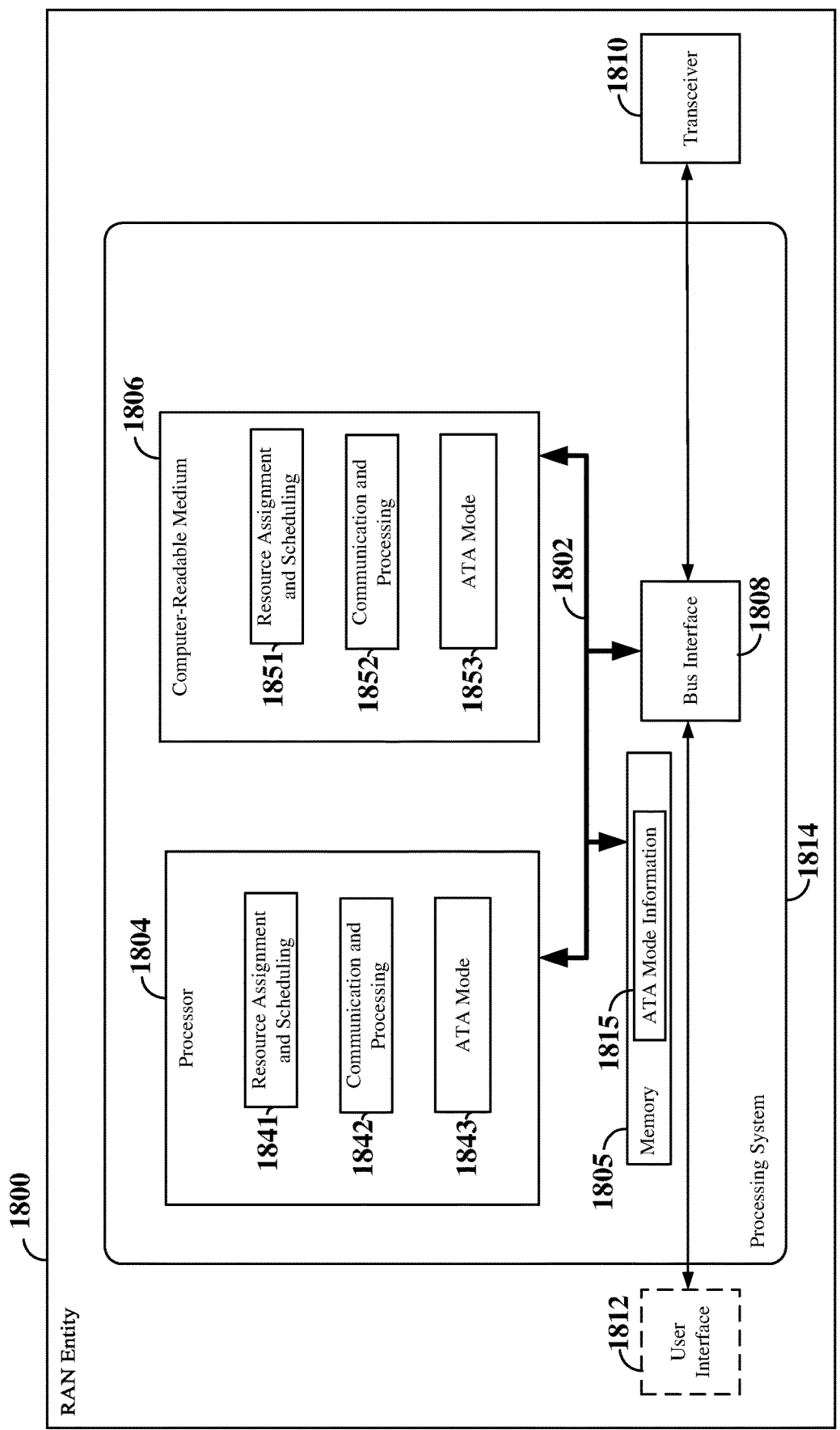
FIG. 18 is a block diagram illustrating an example of a hardware implementation for a radio access network (RAN) entity employing a processing system.

FIG. 18 is a conceptual diagram illustrating an example of a hardware implementation for an exemplary RAN entity 1800 employing a processing system 1814. In accordance with various aspects of the disclosure, an element, or any portion of an element, or any combination of elements may be implemented with a processing system 1814 that includes one or more processors 1804. For example, the RAN entity 1800 may be a base station, parent IAB node, or other type of scheduling entity as illustrated in FIGS. 1, 2, and 4-15, or an IAB donor node central unit or other centralized network node, as illustrated in FIGS. 1, 2, and 4-15.

The processing system 1814 may be substantially the same as the processing system 1614 illustrated in FIG. 16, including a bus interface 1808, a bus 1802, memory 1805, a processor 1804, and a computer-readable medium 1806. Furthermore, the RAN entity 1800 may include an optional user interface 1812 and a transceiver 1810 (or other network interface) substantially similar to those described above in FIG. 16. That is, the processor 1804, as utilized in a RAN entity 1800, may be used to implement any one or more of the processes described below and illustrated in the various figures.

In some aspects of the disclosure, the processor 1804 may include resource assignment and scheduling circuitry 1841, configured to generate, schedule, and modify a resource assignment or grant of time-frequency resources (e.g., a set of one or more resource elements) to a set of one or more scheduled entities (e.g., UEs or child IAB nodes). For example, the resource assignment and scheduling circuitry 1841 may schedule time-frequency resources within a plurality of time division duplex (TDD) and/or frequency division duplex (FDD) slots to carry user data traffic and/or control information to and/or from the set of one or more scheduled entities (e.g., UEs or child IAB nodes).

In various aspects of the disclosure, the resource assignment and scheduling circuitry 1841 may further be configured to schedule backhaul and/or access downlink transmissions based on a downlink transmission timing. In some examples, the downlink transmission timing may be a common downlink transmission timing throughout the wireless communication network. The resource assignment and scheduling circuitry 1841 may further be configured to execute resource assignment and scheduling software 1851 included on the computer-readable medium 1806 to implement one or more functions described herein.

The processor 1804 may further include communication and processing circuitry 1842, configured to communicate with the set of one or more scheduled entities (e.g., a UE or child IAB node). In addition, in examples in which the RAN entity 1800 is a scheduling entity, the communication and processing circuitry 1842 may further be configured to communicate with another scheduling entity (e.g., a parent IAB node of the RAN entity 1800). Furthermore, in examples in which the RAN entity 1800 is a centralized network node, the communication and processing circuitry 1842 may further be configured to communicate with a scheduling entity (e.g., a base station or parent IAB node) of a scheduled entity in a wireless communication network (e.g., an IAB network).

In some examples, the communication and processing circuitry 1842 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1842 may be configured to generate and transmit, via the transceiver 1810, an ATA mode indication message to a scheduled entity of the set of one or more scheduled entities instructing the scheduled entity to enter the ATA mode. In examples in which the RAN entity 1800 is a scheduling entity, the ATA mode indication message may be an L1 signal or DL MAC-CE. In addition, the communication and processing circuitry 1842 may further be configured to receive an ATA mode indication message (e.g., RRC message) from a centralized network node indicating that the scheduled entity is entering the ATA mode.

In examples in which the RAN entity 1800 is a centralized network node, the ATA mode indication message may be an RRC message. In addition, the RAN entity 1800 may further be configured to transmit an ATA mode indication message (e.g., RRC message) to the scheduling entity of the scheduled entity indicating that the scheduled entity is entering the ATA mode.

The communication and processing circuitry 1842 may further be configured to receive an ATA mode indication message from the scheduled entity upon the scheduled entity entering the ATA mode. In examples in which the RAN entity 1800 is the scheduling entity, the ATA mode indication message may include UCI, RACH, or UL MAC-CE. In examples in which the RAN entity 1800 is the centralized network node, the ATA mode indication message may include an RRC message.

The communication and processing circuitry 1842 may further be configured to receive an estimated RTT and/or an unadjusted uplink signal from the scheduled entity while the scheduled entity is in the ATA mode.

The communication and processing circuitry 1842 may further be configured to transmit ATA mode information 1815 to the scheduled entity. The ATA mode information 1815 may include, for example, one or more parameters (e.g., elapsed tracking time criteria and/or additional criteria, such as synchronization source criteria) configured by the RAN entity 1800 (e.g., the scheduling entity or the centralized network node) to be utilized by the scheduled entity to determine whether to operate in the autonomous time adjustment mode. In some examples, the ATA mode information 1815 may further include a configuration of the scheduled entity to transmit an unadjusted signal and/or the estimated RTT to the scheduling entity when operating in the ATA mode. In some examples, the ATA mode information 1815 may further include the ATA mode indication instructing the scheduled entity to enter the ATA mode. The ATA mode information 1815 may be stored, for example, in memory 1805. In examples in which the ATA mode indication is received from the scheduled entity, ATA mode information 1815 stored in memory 1805 may include the received ATA mode indication.

In examples in which the RAN entity 1800 is the scheduling entity, the communication and processing circuitry 1842 may further be configured to transmit a TA command to the scheduled entity for use by the scheduled entity in tracking changes to the TA value. The communication and processing circuitry 1842 may further be configured to transmit a skew between uplink and downlink timing in the wireless communication network to the scheduled entity. The communication and processing circuitry 1842 may further be configured to transmit a downlink signal to the scheduled entity for use by the scheduled entity in adjusting the uplink transmission timing within the scheduled entity. The communication and processing circuitry 1842 may further be configured to execute communication and processing software 1852 included on the computer-readable medium 1806 to implement one or more functions described herein.

The processor 1804 may further include autonomous time adjustment (ATA) mode circuitry 1843, configured to determine when a scheduled entity is able to and/or has entered the ATA mode. In some examples, the ATA mode circuitry 1843 may be configured to determine that the scheduled entity has entered the ATA mode by receiving the ATA mode indication from the scheduled entity indicating that the scheduled entity has entered the ATA mode. The ATA mode circuitry 1843 may further be configured to change the scheduled entity from a normal mode to the ATA mode upon receiving the ATA mode indication from the scheduled entity indicating that the scheduled entity has entered the ATA mode.

In other examples, the ATA mode circuitry 1843 may be configured to determine that the scheduled entity should enter the ATA mode based on one more criteria. For example, the ATA mode circuitry 1843 may be configured to receive a tracking indication from the scheduled entity indicating a period of time during which the scheduled entity tracked downlink transmission timing within the wireless communication network from the scheduling entity. When the period of time is greater than or equal to a threshold, the ATA mode circuitry 1843 may change the scheduled entity to the ATA mode and transmit the ATA mode information 1815 including the ATA mode indication to the scheduled entity instructing the scheduled entity to enter the ATA mode.

The ATA mode circuitry 1843 may further be configured to evaluate the confidence level in the internal timing reference of the scheduled entity based on one or more additional criteria. Examples of additional criteria may include, but are not limited to, the number of different synchronization sources utilized by the scheduled entity to synchronize its internal timing, the respective link quality with each of the OTA synchronization sources, a respective confidence metric associated with each of the synchronization sources, and/or a respective mobility state of the scheduled entity and/or scheduling entity. In some examples, the ATA mode circuitry 1843 may be configured to determine an overall confidence level related to the internal timing reference of the scheduled entity based on one or more of the criteria. The ATA mode circuitry 1843 may further be configured to transmit the ATA mode indication to the scheduled entity when the overall confidence level is above a threshold.

The ATA mode circuitry 1843 may further be configured to configure and generate the ATA mode information 1815 for the scheduled entity. In some examples, the ATA mode information 1815 may include one or more parameters (e.g., elapsed tracking time criteria and/or additional criteria, such as synchronization source criteria) to be utilized by the scheduled entity to determine whether to operate in the autonomous time adjustment mode. In some examples, the ATA mode information 1815 may further include a configuration of the scheduled entity to transmit an unadjusted signal and/or the estimated RTT to the scheduling entity when operating in the ATA mode. In some examples, the ATA information 1815 may further include the ATA mode indication.

In examples in which the RAN entity 1800 is the scheduling entity, the ATA mode circuitry 1843 may further be configured to manage the transmission of timing advance (TA) values to the scheduled entity based upon a determination related to the scheduled entity entering the ATA mode. In some examples, the ATA mode circuitry 1843 may preclude transmission of TA values to the scheduled entity when the scheduled entity is operating in the ATA mode. In other examples, the ATA mode circuitry 1843 may adjust (e.g., reduce) the frequency of transmission of TA values to the scheduled entity when the scheduled entity is operating in the ATA mode. For example, the ATA mode circuitry 1843 may operate together with the communication and processing circuitry 1842 and resource assignment and scheduling circuitry 1841 to aperiodically request an unadjusted uplink signal or estimated RTT from the scheduled entity to update the TA value. The ATA mode circuitry 1843 may further be configured to execute ATA mode software 1853 included on the computer-readable medium 1806 to implement one or more functions described herein.

Figure 19:
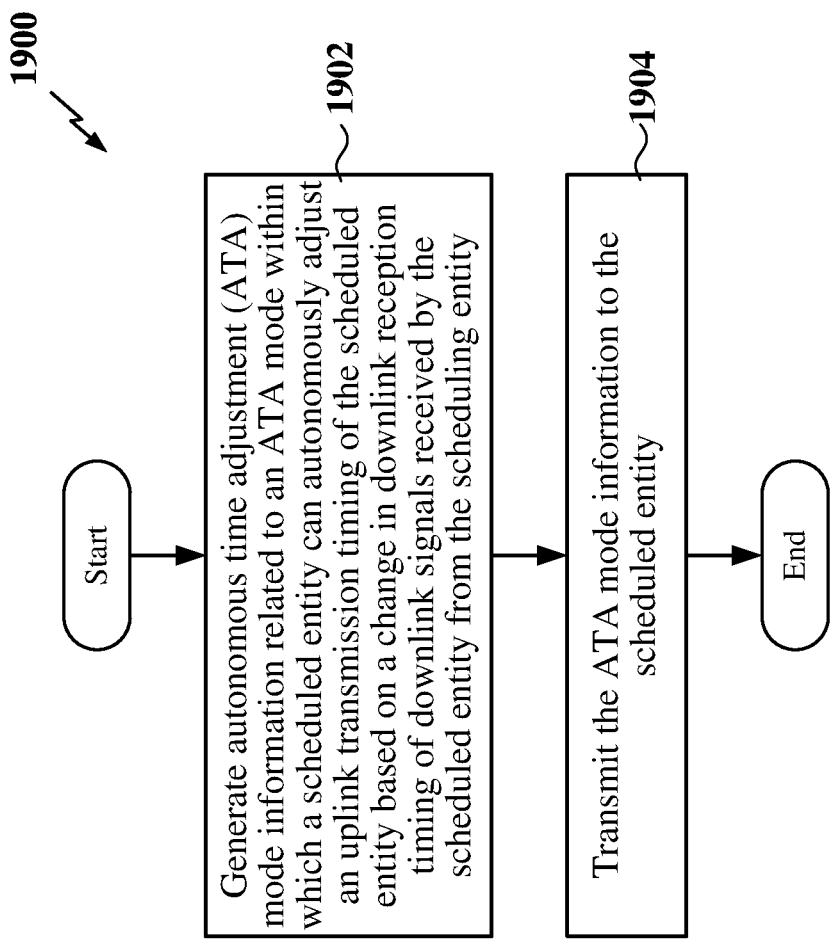
FIG. 19 is a flow chart illustrating another exemplary process for autonomous adjustment of the uplink transmission timing.

FIG. 19 is a flow chart illustrating a process 1900 for autonomous time adjustment in a wireless communication network according to some aspects of the disclosure. As described below, some or all illustrated features may be omitted in a particular implementation within the scope of the present disclosure, and some illustrated features may not be required for implementation of all embodiments. In some examples, the process 1900 may be carried out by the RAN entity illustrated in FIG. 18. In some examples, the process 1900 may be carried out by any suitable apparatus or means for carrying out the functions or algorithm described below.

At block 1902, the RAN entity (e.g., a base station, parent IAB node, or IAB donor node central unit) may generate autonomous time adjustment (ATA) mode information related to an ATA mode within which a scheduled entity can autonomously adjust an uplink transmission timing of the scheduled entity based on a change in downlink reception timing of downlink signals received by the scheduled entity from a scheduling entity in wireless communication with the scheduled entity.

In some examples, the scheduling entity may receive an ATA mode indication from the scheduled entity indicating that the scheduled entity has entered the ATA mode. In this example, the RAN entity may generate the ATA mode information in response to receiving the ATA mode indication.

In other examples, the ATA mode information includes an ATA mode indication instructing the scheduled entity to enter the ATA mode. In some examples, the RAN entity may further receive a tracking indication from the scheduled entity indicating a period of time during which the scheduled entity tracked downlink transmission timing within the wireless communication network from the scheduling entity. In this example, the RAN entity may generate the ATA mode information including the ATA mode indication when the period of time is greater than or equal to a threshold. In some examples, the RAN entity may further generate the ATA mode information including the ATA mode indication based upon one or more of a number of synchronization sources utilized by the scheduled entity to synchronize timing with the wireless communication network, a respective link quality between the scheduled entity and at least one of the synchronization sources, a respective confidence metric indicating a respective timing confidence of each of the synchronization sources, or a respective mobility state of at least one of the scheduled entity or the scheduling entity.

In some examples, the ATA mode information includes one or more parameters to be utilized by the scheduled entity to determine whether to operate in the ATA mode. In some examples, the RAN entity may further configure the scheduled entity to at least one unadjusted uplink signal with unadjusted uplink transmission timing to the scheduling entity when operating in the ATA mode. In this example, the ATA mode information includes a configuration of the scheduled entity to transmit the at least one unadjusted uplink signal. In some examples, the RAN entity may further configure the scheduled entity to transmit an estimation of a round-trip-time (RTT) of communication between the scheduled entity and the scheduling entity when operating in the ATA mode. In this example, the ATA mode information includes a configuration of the scheduled entity to transmit estimation of the RTT. In examples in which the RAN entity is the scheduling entity, the scheduling entity may further receive the estimation of the RTT from the scheduled entity.

In some examples, when the RAN entity is the scheduling entity, the scheduling entity may further determine that the scheduled entity has entered the ATA mode. In this example, the scheduling entity may manage transmission of timing advance (TA) values to the scheduled entity based on the determination. In some examples, the scheduling entity may preclude (discontinue) or otherwise reduce transmission of TA values to the scheduled entity when the scheduled entity is operating in the ATA mode. For example, the ATA mode circuitry 1843 together with the communication and processing circuitry 1842 shown and described above in connection with FIG. 18 may provide a means to generate the ATA mode information.

At block 1904, the RAN entity may transmit the ATA mode information to the scheduled entity. For example, the ATA mode circuitry 1843 together with the communication and processing circuitry 1842 and the transceiver 1810 shown and described above in connection with FIG. 18 may provide a means to transmit the ATA mode information to the scheduled entity.

Figure 20:
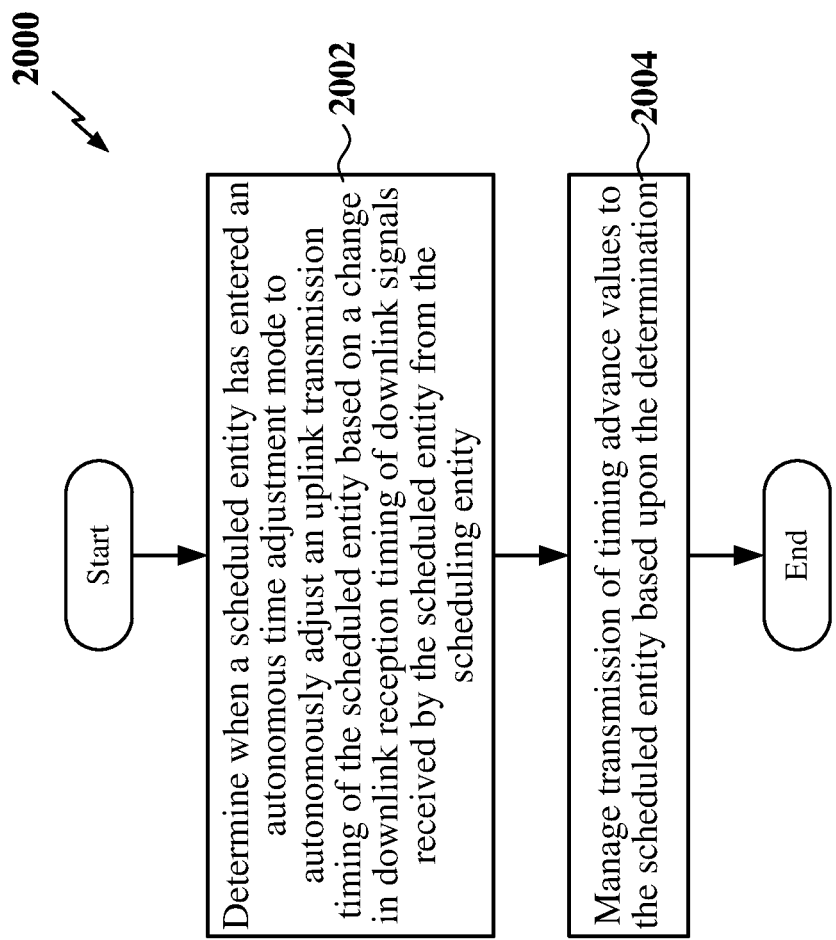
FIG. 20 is a flow chart illustrating another exemplary process for autonomous adjustment of the uplink transmission timing.

FIG. 20 is a flow chart illustrating a process 2000 for autonomous time adjustment in a wireless communication network according to some aspects of the disclosure. As described below, some or all illustrated features may be omitted in a particular implementation within the scope of the present disclosure, and some illustrated features may not be required for implementation of all embodiments. In some examples, the process 2000 may be carried out by the RAN entity (e.g., a scheduling entity) illustrated in FIG. 18. In some examples, the process 2000 may be carried out by any suitable apparatus or means for carrying out the functions or algorithm described below.

At block 2002, the scheduling entity (e.g., a base station or parent IAB node) may determine when a scheduled entity in wireless communication with the scheduling entity has entered an autonomous time adjustment (ATA) mode to autonomously adjust an uplink transmission timing of the scheduled entity based on a change in downlink reception timing of downlink signals received by the scheduled entity from the scheduling entity. In some examples, the scheduling entity may receive an ATA mode indication from the scheduled entity indicating that the scheduled entity has entered the ATA mode. In other examples, the scheduling entity may determine to enter the ATA mode based on one or more criteria related to the internal timing reference of the scheduled entity. For example, the ATA mode circuitry 1843 shown and described above in connection with FIG. 18 may provide a means for determining when the scheduled entity has entered the ATA mode.

At block 2004, the scheduling entity may manage transmission of timing advance (TA) values to the scheduled entity based on the determination. In some examples, the scheduling entity may preclude (discontinue) or otherwise reduce transmission of TA values to the scheduled entity when the scheduled entity is operating in the ATA mode. For example, the ATA mode circuitry 1843 together with the communication and processing circuitry 1842 and resource assignment and scheduling circuitry 1841 shown and described above in connection with FIG. 18 may provide a means for managing transmission of TA values to the scheduled entity.

Figure 21:
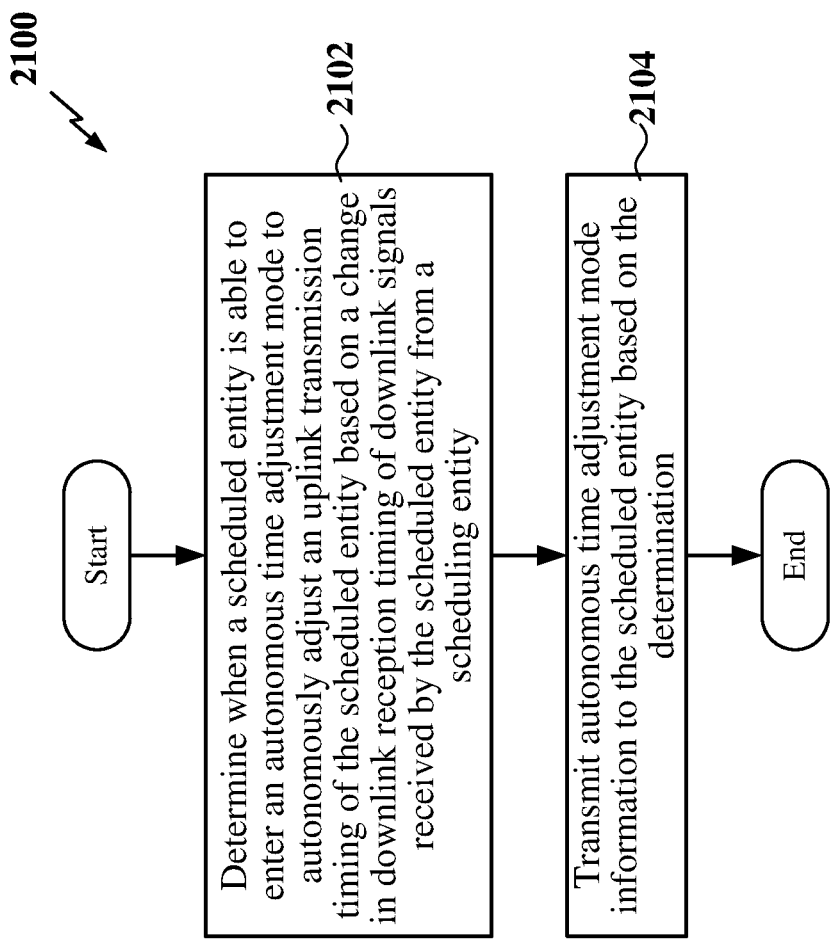
FIG. 21 is a flow chart illustrating another exemplary process for autonomous adjustment of the uplink transmission timing.

FIG. 21 is a flow chart illustrating a process 2100 for autonomous time adjustment in a wireless communication network according to some aspects of the disclosure. As described below, some or all illustrated features may be omitted in a particular implementation within the scope of the present disclosure, and some illustrated features may not be required for implementation of all embodiments. In some examples, the process 2100 may be carried out by the RAN entity (e.g., a centralized network node) illustrated in FIG. 18. In some examples, the process 2100 may be carried out by any suitable apparatus or means for carrying out the functions or algorithm described below.

At block 2102, the centralized network node (e.g., IAB donor node central unit) in a wireless communication network may determine when a scheduled entity in the wireless communication network is able to enter an autonomous time adjustment mode to autonomously adjust an uplink transmission timing of the scheduled entity based on a change in downlink reception timing of downlink signals received by the scheduled entity from a scheduling entity. In some examples, the centralized network node may receive an ATA mode indication from the scheduled entity indicating that the scheduled entity has entered the ATA mode. In other examples, the centralized network node may determine to enter the scheduled entity in the ATA mode based on one or more criteria related to the internal timing reference of the scheduled entity. In other examples, the centralized network node may configure one or more parameters for the scheduled entity to utilize in determining whether to operate in the ATA mode. For example, the ATA mode circuitry 1843 shown and described above in connection with FIG. 18 may provide a means for determining when the scheduled entity is able to enter the ATA mode.

At block 2104, the centralized network node may transmit autonomous time adjustment (ATA) mode information to the scheduled entity based on the determination. In some examples, the ATA mode information may include an ATA mode indication that instructs the scheduled entity to enter the ATA mode. In other examples, the ATA mode information includes the one or more parameters configured for the scheduled entity to utilize in determining whether to enter the ATA mode and transmit the ATA mode indication to the centralized network node. In other examples, the ATA mode information may include a configuration of the scheduled entity to transmit at least one unadjusted uplink signal or an estimation of the RTT when operating in the ATA mode. For example, the ATA mode circuitry 1843 together with the communication and processing circuitry 1842 and the transceiver 1810 shown and described above in connection with FIG. 18 may provide a means for transmitting the ATA mode information to the scheduled entity.

In one configuration, a RAN entity includes means for generating autonomous time adjustment (ATA) mode information related to an ATA mode within which a scheduled entity can autonomously adjust an uplink transmission timing of the scheduled entity based on a change in downlink reception timing of downlink signals received by the scheduled entity from the scheduling entity, and means for transmitting the ATA mode information to the scheduled entity. In one aspect, the aforementioned means for generating the ATA mode information for the scheduled entity and means for transmitting the ATA mode information to the scheduled entity may be the processor(s) 1804 shown in FIG. 18 configured to perform the functions recited by the aforementioned means.

For example, the aforementioned means for generating the ATA mode information may include the ATA mode circuitry 1843 shown in FIG. 18. As another example, the aforementioned means for transmitting the ATA mode information to the scheduled entity may include the ATA mode circuitry 1843, communication and processing circuitry 1842, and transceiver 1810 shown in FIG. 18.

Of course, in the above examples, the circuitry included in the processor 1804 is merely provided as an example, and other means for carrying out the described functions may be included within various aspects of the present disclosure, including but not limited to the instructions stored in the computer-readable storage medium 1806, or any other suitable apparatus or means described in any one of the FIGS. 1, 2, 4, 5, and/or 10-15, and utilizing, for example, the processes and/or algorithms described herein in relation to FIGS. 19-21. In another aspect, the aforementioned means may be a circuit or any apparatus configured to perform the functions recited by the aforementioned means.

The processes shown in FIGS. 17 and 19-21 may include additional aspects, such as any single aspect or any combination of aspects described below and/or in connection with one or more other processes described elsewhere herein.

Aspect 1: A method of wireless communication at a scheduled entity within a wireless communication network, comprising: entering an autonomous time adjustment mode to autonomously adjust an uplink transmission timing of the scheduled entity; observing a change in downlink reception timing of downlink signals received from a scheduling entity by a reception timing difference; determining a transmission timing difference based on the reception timing difference to compensate for the change in the downlink reception timing; and autonomously adjusting the uplink transmission timing of uplink signals transmitted to the scheduling entity by the transmission timing difference.

Aspect 2: The method of aspect 1, further comprising: maintaining a same downlink transmission timing of additional downlink signals transmitted to one or more additional scheduled entities of the scheduled entity irrespective of the change in the downlink reception timing.

Aspect 3: The method of aspect 1 or 2, wherein the determining the transmission timing difference further comprises: calculating the transmission timing difference as a negative of twice the reception timing difference.

Aspect 4: The method of any of aspects 1 through 3, wherein the entering the autonomous time adjustment mode further comprises: tracking downlink transmission timing within the wireless communication network from the scheduling entity; and entering the autonomous time adjustment mode after tracking the downlink transmission timing for a period of time greater than or equal to a threshold.

Aspect 5: The method of any of aspects 1 through 4, wherein the entering the autonomous time adjustment mode further comprises: synchronizing internal timing of the scheduled entity with one or more synchronization sources; and entering the autonomous time adjustment mode based upon one or more of a number of the one or more synchronization sources, a respective link quality associated with at least one of the one or more synchronization sources, a respective confidence metric indicating a respective timing confidence of each of the one or more synchronization sources, or a respective mobility state of at least one of the scheduled entity or the scheduling entity.

Aspect 6: The method of any of aspects 1 through 5, further comprising: transmitting a message indicating the scheduled entity is operating in the autonomous time adjustment mode to at least one of the scheduling entity or a centralized network node within the wireless communication network.

Aspect 7: The method of any of aspects 1 through 3, wherein the entering the autonomous time adjustment mode further comprises: entering the autonomous time adjustment mode upon receiving an instruction from the scheduling entity or a centralized network node within the wireless communication network.

Aspect 8: The method of any of aspects 1 through 7, further comprising: transmitting at least one unadjusted uplink signal with unadjusted uplink transmission timing to the scheduling entity periodically, aperiodically, or based on an occurrence of a triggering event, wherein the triggering event comprises at least one of an expiration of a timer or an accumulated transmission timing difference exceeding a threshold.

Aspect 9: The method of any of aspects 1 through 8, further comprising: transmitting an estimation of a round-trip time (RTT) based on the transmission timing difference to the scheduling entity.

Aspect 10: The method of any of aspects 1 through 9, further comprising: receiving a timing advance value to utilize for the uplink transmission timing from the scheduling entity, wherein autonomously adjusting the uplink transmission timing of uplink signals transmitted to the scheduling entity by the transmission timing difference further comprises: autonomously adjusting the timing advance value by the transmission timing difference.

Aspect 11: The method of any of aspects 1 through 9, further comprising: receiving an indication of a skew between downlink transmission timing and uplink reception timing, wherein the skew comprises a timing offset and an additional timing adjustment; and operating in an open-loop mode to autonomously adjust the uplink transmission timing based on the skew and the transmission timing difference.

Aspect 12: A method of wireless communication at a radio access network (RAN) entity within a wireless communication network, comprising: generating autonomous time adjustment (ATA) mode information related to an ATA mode within which a scheduled entity can autonomously adjust an uplink transmission timing of the scheduled entity based on a change in downlink reception timing of downlink signals received by the scheduled entity from a scheduling entity; and transmitting the ATA mode information to the scheduled entity.

Aspect 13: The method of aspect 12, wherein the generating the ATA mode information further comprises: generating the ATA mode information comprising an ATA mode indication instructing the scheduled entity to enter the ATA mode.

Aspect 14: The method of aspect 12 or 13, further comprising: receiving a tracking indication from the scheduled entity indicating a period of time during which the scheduled entity tracked downlink transmission timing within the wireless communication network from the scheduling entity, wherein the generating the ATA mode information comprising the ATA mode indication further comprises: determining that the scheduled entity should enter the ATA mode when the period of time is greater than or equal to a threshold; and generating the ATA mode information comprising the ATA mode indication in response to the determining that the scheduled entity should enter the ATA mode.

Aspect 15: The method of any of aspects 12 through 14, wherein the generating the ATA mode information comprising the ATA mode indication further comprises: determining that the scheduled entity should enter the ATA mode based upon one or more of a number of synchronization sources utilized by the scheduled entity to synchronize timing with the wireless communication network, a respective link quality between the scheduled entity and at least one of the synchronization sources, a respective confidence metric indicating a respective timing confidence of each of the synchronization sources, or a respective mobility state of at least one of the scheduled entity or the scheduling entity; and generating the ATA mode information comprising the ATA mode indication in response to the determining that the scheduled entity should enter the ATA mode.

Aspect 16: The method of any of aspects 12 through 15, wherein the generating the ATA mode information further comprises: configuring one or more parameters to be utilized by the scheduled entity to determine whether to operate in the ATA mode; and including the one or more parameters in the ATA mode information.

Aspect 17: The method of aspect 12, further comprising: receiving an ATA mode indication from the scheduled entity indicating the scheduled entity has entered the ATA mode, wherein the generating the ATA mode information further comprise: generating the ATA mode information in response to receiving the ATA mode indication.

Aspect 18: The method of any of aspects 12 through 17, wherein the generating the ATA mode information further comprises: configuring the scheduled entity to transmit at least one unadjusted uplink signal with unadjusted uplink transmission timing to the scheduling entity when operating in the ATA mode; and including a configuration of the scheduled entity to transmit the at least one unadjusted uplink signal in the ATA mode information.

Aspect 19: The method of any of aspects 12 through 18, wherein the generating the ATA mode information further comprising: configuring the scheduled entity to transmit to the scheduling entity an estimation of a round-trip time (RTT) of communication between the scheduled entity and the scheduling entity when operating in the ATA mode; and including a configuration of the scheduled entity to transmit the estimation of the RTT in the ATA mode information.

Aspect 20: The method of aspect 19, wherein the RAN entity comprises the scheduling entity.

Aspect 21: The method of aspect 20, further comprising: receiving the estimation of the RTT from the scheduled entity.

Aspect 22: The method of any of aspects 12 through 21, wherein the RAN entity comprises the scheduling entity and further comprising: determining that the scheduled entity has entered the ATA mode; and managing transmission of timing advance values to the scheduled entity based upon the determination.

Aspect 23: The method of aspect 22, wherein the managing transmission of the timing advance values further comprises: precluding transmission of the timing advance values to the scheduled entity when operating in the autonomous time adjustment mode.

Aspect 24: The method of any of aspects 12 through 19, wherein the RAN entity comprises a centralized network node, and further comprising: transmitting the ATA mode information for the scheduled entity to the scheduling entity.

Aspect 25: An apparatus for wireless communication comprising a processor, a wireless transceiver coupled to the processor, and a memory coupled to the processor, the processor and memory configured to perform a method of any one of aspects 1 through 11.

Aspect 26: An apparatus for wireless communication comprising a processor, a wireless transceiver coupled to the processor, and a memory coupled to the processor, the processor and memory configured to perform a method of any one of aspects 12 through 24.

Aspect 27: An apparatus for wireless communication comprising at least one means for performing a method of any one of aspects 1 through 11.

Aspect 28: An apparatus for wireless communication comprising at least one means for performing a method of any one of aspects 12 through 24.

Aspect 29: An article of manufacture comprising a non-transitory computer-readable medium storing computer-executable code, comprising code for causing an apparatus to perform a method of any one of aspects 1 through 11.

Aspect 30: An article of manufacture comprising a non-transitory computer-readable medium storing computer-executable code, comprising code for causing an apparatus to perform a method of any one of aspects 12 through 24.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-16, and 18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a scheduled entity within a wireless communication network, comprising:
   entering an autonomous time adjustment mode to autonomously adjust an uplink transmission timing of the scheduled entity;
   observing a change in downlink reception timing of downlink signals received from a scheduling entity by a reception timing difference, the scheduled entity comprising a first integrated access backhaul (IAB) node and the scheduling entity comprising a second IAB node;
   determining a transmission timing difference based on the reception timing difference to compensate for the change in the downlink reception timing; and
   autonomously adjusting the uplink transmission timing of uplink signals transmitted to the scheduling entity by the transmission timing difference.

2. The method of claim 1, further comprising:
   maintaining a same downlink transmission timing of additional downlink signals transmitted to one or more additional scheduled entities of the scheduled entity irrespective of the change in the downlink reception timing.

3. The method of claim 1, wherein the determining the transmission timing difference further comprises:
   calculating the transmission timing difference as a negative of twice the reception timing difference.

4. The method of claim 1, wherein the entering the autonomous time adjustment mode further comprises:
   tracking downlink transmission timing within the wireless communication network from the scheduling entity; and
   entering the autonomous time adjustment mode after tracking the downlink transmission timing for a period of time greater than or equal to a threshold.

5. The method of claim 1, wherein the entering the autonomous time adjustment mode further comprises:
   synchronizing internal timing of the scheduled entity with one or more synchronization sources; and
   entering the autonomous time adjustment mode based upon one or more of a number of the one or more synchronization sources, a respective link quality associated with at least one of the one or more synchronization sources, a respective confidence metric indicating a respective timing confidence of each of the one or more synchronization sources, or a respective mobility state of at least one of the scheduled entity or the scheduling entity.

6. The method of claim 1, further comprising:
   transmitting a message indicating the scheduled entity is operating in the autonomous time adjustment mode to at least one of the scheduling entity or a centralized network node within the wireless communication network.

7. The method of claim 1, wherein the entering the autonomous time adjustment mode further comprises:
   entering the autonomous time adjustment mode upon receiving an instruction from the scheduling entity or a centralized network node within the wireless communication network.

8. The method of claim 1, further comprising:
   transmitting at least one unadjusted uplink signal with unadjusted uplink transmission timing to the scheduling entity periodically, aperiodically, or based on an occurrence of a triggering event, wherein the triggering event comprises at least one of an expiration of a timer or an accumulated transmission timing difference exceeding a threshold.

9. The method of claim 1, further comprising:
   transmitting an estimation of a round-trip time (RTT) based on the transmission timing difference to the scheduling entity.

10. The method of claim 1, further comprising:
    receiving a timing advance value to utilize for the uplink transmission timing from the scheduling entity, wherein autonomously adjusting the uplink transmission timing of uplink signals transmitted to the scheduling entity by the transmission timing difference further comprises:
    autonomously adjusting the timing advance value by the transmission timing difference.

11. The method of claim 1, further comprising:
    receiving an indication of a skew between downlink transmission timing and uplink reception timing, wherein the skew comprises a timing offset and an additional timing adjustment; and operating in an open-loop mode to autonomously adjust the uplink transmission timing based on the skew and the transmission timing difference.

12. A scheduled entity within a wireless communication network, comprising:
   a transceiver configured to communicate with a scheduling entity in the wireless communication network;
   a memory; and
   a processor coupled to the transceiver and the memory, wherein the processor and the memory are configured to:
      enter an autonomous time adjustment mode to autonomously adjust an uplink transmission timing of the scheduled entity;
      observe a change in downlink reception timing of downlink signals received from the scheduling entity by a reception timing difference, the scheduled entity comprising a first integrated access backhaul (IAB) node and the scheduling entity comprising a second TAB node;
      determine a transmission timing difference based on the reception timing difference to compensate for the change in the downlink reception timing; and
      autonomously adjust the uplink transmission timing of uplink signals transmitted to the scheduling entity by the transmission timing difference.

13. The scheduled entity of claim 12, wherein the processor and the memory are further configured to:
   maintain a same downlink transmission timing of additional downlink signals transmitted to one or more additional scheduled entities of the scheduled entity irrespective of the change in the downlink reception timing.

14. The scheduled entity of claim 12, wherein the processor and the memory are further configured to:
   calculate the transmission timing difference as a negative of twice the reception timing difference.

15. The scheduled entity of claim 12, wherein the processor and the memory are further configured to:
   track downlink transmission timing within the wireless communication network from the scheduling entity; and
   enter the autonomous time adjustment mode after tracking the downlink transmission timing for a period of time greater than or equal to a threshold.

16. The scheduled entity of claim 12, wherein the processor and the memory are further configured to:
   synchronize internal timing of the scheduled entity with one or more synchronization sources; and
   enter the autonomous time adjustment mode based upon one or more of a number of the one or more synchronization sources, a respective link quality associated with at least one of the one or more synchronization sources, a respective confidence metric indicating a respective timing confidence of each of the one or more synchronization sources, or a respective mobility state of at least one of the scheduled entity or the scheduling entity.

17. The scheduled entity of claim 16, wherein the one or more synchronization sources comprises at least one of the scheduling entity, an internal global navigation satellite system, a neighboring scheduling entity within the wireless communication network, or a nearby base station operating at a different carrier frequency.

18. The scheduled entity of claim 12, wherein the processor and the memory are further configured to:
   transmit a message indicating the scheduled entity is operating in the autonomous time adjustment mode to at least one of the scheduling entity or a centralized network node within the wireless communication network, or
   enter the autonomous time adjustment mode upon receiving an instruction from the scheduling entity or a centralized network node within the wireless communication network.

19. The scheduled entity of claim 12, wherein the processor and the memory are further configured to:
   transmit at least one unadjusted uplink signal with unadjusted uplink transmission timing to the scheduling entity.

20. The scheduled entity of claim 12, wherein the processor and the memory are further configured to:
   transmit an estimation of a round-trip time (RTT) based on the transmission timing difference to the scheduling entity.

21. The scheduled entity of claim 12, wherein the processor and the memory are further configured to:
   receive a timing advance value to utilize for the uplink transmission timing from the scheduling entity, wherein autonomously adjusting the uplink transmission timing of uplink signals transmitted to the scheduling entity by the transmission timing difference further comprises:
   autonomously adjust the timing advance value by the transmission timing difference.

22. The scheduled entity of claim 12, wherein the processor and the memory are further configured to:
   receive an indication of a skew between downlink transmission timing and uplink reception timing, wherein the skew comprises a timing offset and an additional timing adjustment; and
   operate in an open-loop mode to autonomously adjust the uplink transmission timing based on the skew and the transmission timing difference.

23. A scheduled entity within a wireless communication network, comprising:
   means for entering an autonomous time adjustment mode to autonomously adjust an uplink transmission timing of the scheduled entity;
   means for observing a change in downlink reception timing of downlink signals received from a scheduling entity by a reception timing difference, the scheduled entity comprising a first integrated access backhaul (IAB) node and the scheduling entity comprising a second IAB node;
   means for determining a transmission timing difference based on the reception timing difference to compensate for the change in the downlink reception timing; and
   means for autonomously adjusting the uplink transmission timing of uplink signals transmitted to the scheduling entity by the transmission timing difference.

24. The scheduled entity of claim 23, further comprising:
   means for calculating the transmission timing difference as a negative of twice the reception timing difference.

25. The scheduled entity of claim 23, further comprising:
   means for transmitting at least one unadjusted uplink signal with unadjusted uplink transmission timing to the scheduling entity.

26. The scheduled entity of claim 23, further comprising:
means for transmitting an estimation of a round-trip time (RTT) based on the transmission timing difference to the scheduling entity.

27. The scheduled entity of claim 23, further comprising:
means for receiving a timing advance value to utilize for the uplink transmission timing from the scheduling entity; and
means for autonomously adjusting the timing advance value by the transmission timing difference.

28. The scheduled entity of claim 23, further comprising:
means for receiving an indication of a skew between downlink transmission timing and uplink reception timing, wherein the skew comprises a timing offset and an additional timing adjustment; and
means for operating in an open-loop mode to autonomously adjust the uplink transmission timing based on the skew and the transmission timing difference.

* * * * *